United States Patent [19]

Wada

[11] Patent Number: 5,675,080

[45] Date of Patent: Oct. 7, 1997

[54] ABNORMALITY DETECTING METHOD AND APPARATUS FOR EXHAUST GAS RECIRCULATION CONTROL SYSTEM OF INTERNAL COMBUSTION ENGINE

[75] Inventor: Shuichi Wada, Himeji, Japan

[73] Assignee: Mitsubishi Denki Kabushiki Kaisha, Tokyo, Japan

[21] Appl. No.: 500,135

[22] Filed: Jul. 10, 1995

[30] Foreign Application Priority Data

Jul. 25, 1994 [JP] Japan .................................. 6-172751

[51] Int. Cl.$^6$ .............................. F02M 15/00; F02M 25/07
[52] U.S. Cl. .................. 73/118.1; 123/571; 364/431.061
[58] Field of Search ........................... 73/115, 116, 117.2, 73/117.3, 118.1, 118.2; 364/431.061; 123/568, 571

[56] References Cited

U.S. PATENT DOCUMENTS

| 4,671,107 | 6/1987 | Chiesa et al. .............. | 73/118.1 |
| 4,770,146 | 9/1988 | Shibata et al. ............. | 73/118.1 |
| 5,103,655 | 4/1992 | Kano et al. ................ | 73/118.1 |
| 5,207,093 | 5/1993 | Maeda ....................... | 73/118.1 |
| 5,474,051 | 12/1995 | Matsumoto et al. ......... | 73/118.1 |
| 5,513,616 | 5/1996 | Matsumoto et al. ......... | 73/118.1 |

FOREIGN PATENT DOCUMENTS

| 35 35 224 | 4/1986 | Germany . |
| 37 03 091 | 8/1988 | Germany . |
| 41 14 031 | 11/1991 | Germany . |
| 42 03 235 | 9/1992 | Germany . |
| 42 31 316 | 9/1992 | Germany . |
| 42 08 133 | 10/1992 | Germany . |
| 42 19 339 | 1/1993 | Germany . |
| 42 22 414 | 1/1993 | Germany . |
| 42 39 773 | 6/1994 | Germany . |
| 62-51746 | 3/1987 | Japan . |
| 2-9937 | 1/1990 | Japan . |

Primary Examiner—George M. Dombroske
Attorney, Agent, or Firm—Sughrue, Mion, Zinn, Macpeak & Seas, PLLC

[57] ABSTRACT

An apparatus for detecting an abnormality in an exhaust gas recirculation control system of an engine is disclosed, which abnormality is brought about by an operation lag of a diaphragm constituting an exhaust gas recirculation valve. The exhaust gas recirculation valve is controlled in dependence on engine operation information including an intake manifold pressure. Condition to be satisfied for enabling the abnormality decision is detected. Upon satisfaction of the abnormality decision enabling condition, the exhaust gas recirculation valve is forcibly opened and/or closed. On the basis of difference of the intake manifold pressures detected upon enforcive opening/closing of the exhaust gas recirculation valve, possible abnormality of the exhaust gas recirculation control system is decided. A temporal period during which the exhaust gas recirculation valve remains opened after the start of the engine is measured to be subsequently compared with a predetermined reference duration. When the former is greater than the latter, indicating that the exhaust gas recirculation valve is sufficiently warmed up, the abnormality detection processing is enabled. Influence of the temperature characteristic of the diaphragm of the exhaust gas recirculation valve can be excluded from the abnormality decision.

15 Claims, 12 Drawing Sheets

ABNORMALITY DETECTING METHOD AND APPARATUS FOR EXHAUST GAS RECIRCULATION CONTROL SYSTEM OF INTERNAL COMBUSTION ENGINE

BACKGROUND OF THE INVENTION

1. Field of the Invention

The present invention generally relates to an abnormality detecting apparatus for detecting abnormality or fault in an exhaust gas recirculation control system of an internal combustion engine (hereinafter also referred to as the engine for short). In particular, the invention is concerned with an abnormality detecting apparatus which is improved in respect to reliability or capability of detecting abnormality while suppressing erroneous detection to a possible minimum. Further, the present invention is also directed to a method of detecting abnormality of an exhaust gas recirculation control system, which method can be carried out by using a so-called microcomputer programmed correspondingly.

2. Description of Related Art

Heretofore, in the field of the engine control systems for the automobiles or motor vehicles, the exhaust gas recirculation control techniques for feeding back or recirculating a part of exhaust gas to the engine for thereby lowering the combustion temperature for the purpose of decreasing $NO_x$-components contained in the engine exhaust gas are widely known. For having better understanding of the background techniques of the invention, description will first be made in some detail of conventional exhaust gas recirculation control systems.

FIG. 8 is a block diagram showing only schematically a general arrangement of an engine system equipped with an exhaust gas recirculation control system known heretofore.

Referring to FIG. 8, the engine system is comprised of an engine body 1 having a plurality of cylinders, an air cleaner 2 for purifying intake air to be introduced into the engine 1, an intake pipe 3 for feeding the air drawn through the air cleaner 2 to the engine, an intake manifold 4 for connecting the intake pipe 3 to the plurality of engine cylinders, a fuel injector 5 for injecting fuel into the engine cylinders, a pressure sensor 6 for detecting a pressure Pb within the intake manifold 4 or within the intake pipe 3 at a location in the vicinity of the intake manifold 4 (this pressure will be referred to as the intake manifold pressure), a throttle valve 7 disposed within the intake pipe for controlling an intake air flow, a throttle position sensor 8 for detecting an opening degree θ of the throttle valve 7, and a linear-solenoid type bypass air flow rate control means 9 for controlling an air flow rate which bypasses the throttle valve 7 via a pipe connected across the throttle valve 7 in parallel to the intake pipe 3.

An exhaust gas recirculation pipe (hereinafter also referred to as the EGR pipe) 10 is provided for feeding back or recirculating a part of the exhaust gas discharged from the engine 1 to the intake pipe 3. An exhaust gas recirculation control valve (hereinafter also referred to as the EGR control valve) 11 of a vacuum-motor-driven type is installed in the EGR pipe 10 for controlling the flow rate of the exhaust gas flowing through the EGR pipe 10. Opening and closing of the EGR control valve 11 is controlled by a three-way solenoid valve device (hereinafter referred to as the EGR solenoid device) 12. The EGR control valve 11 and the EGR solenoid device 12 cooperate to constitute an exhaust gas recirculation flow control means for adjusting the exhaust gas recirculation flow rate in dependence on the operation states of the engine 1 under the control of an electronic control unit 22, which will be described later on.

An ignition coil 13 serves for generating a high voltage required for combustion of air/fuel mixture within the individual cylinders of the engine 1. Provided in association with the ignition coil 13 is a firing or ignitor circuit 14 for interrupting a primary current of the ignition coil 13 to thereby generate a spark for triggering combustion of the air/fuel mixture. The exhaust gas resulting from the combustion within the engine cylinders is discharged through an exhaust pipe 15. A catalytic converter 16 for purifying the exhaust gas is installed in the exhaust pipe 15 at a position downstream of a location from which the EGR pipe 10 is branched.

An ignition signal Q generated by the ignitor 14 for driving the ignition coil 13 has a frequency which corresponds to the rotation speed (rpm) of the engine 1 and thus can be utilized as a sensor signal indicative of the rotation speed or number (rpm) of the engine 1. Further, as other engine operation state sensor means, there are provided a water temperature sensor 17 for detecting a temperature of the cooling water of the engine 1 to generate an engine temperature signal T and an idle switch 18 for detecting whether or not the throttle valve 7 is in the fully closed state (i.e., the state in which the opening degree of the throttle valve is zero), to thereby generate an idle signal I when the throttle valve 7 is in the fully closed state. An air-conditioner on/off switch 19 is provided for generating an air-conditioner on/off command signal A for turning on or off an air conditioner (not shown) which represents a typical one of the engine loads. An air-conditioner controller 19A is adapted to control the air conditioner in accordance with an air-conditioner control signal D generated by the electronic control unit 22 in response to the air-conditioner on/off signal A by taking into consideration the operation state of the engine.

The pressure sensor 6, the throttle position sensor 8, the ignition coil 13, the water temperature sensor 17, the idle switch 18, the air-conditioner on/off switch 19 and others cooperate to constitute a sensor means which provides information concerning the operation states of the engine 1. An ignition key switch 21 is closed upon starting of the engine operation for supplying an electric power to various electric/electronic units and devices of the motor vehicle from an onboard battery 20.

The electronic control unit 22 mentioned previously is constituted by a computer system. The electronic control unit 22 which is put into operation upon reception of an electric power from the battery 20 via the ignition key switch 21 is designed to acquire from a variety of sensor means mentioned above the engine operation state information such as those typified by the throttle opening degree signal θ, the idle signal I, the intake manifold pressure Pb, the cooling water temperature T, the ignition signal Q (i.e., engine speed (rpm) signal), the air-conditioner on/off signal A and others to thereby control the fuel injection amount, the exhaust gas recirculation flow rate and the bypass air flow rate, respectively, in addition to the control of the air-conditioner.

More specifically, the electronic control unit 22 includes a fuel control module, an exhaust gas recirculation control module, an EGR system abnormality decision module and others, whereby a fuel injection control signal J for the fuel injector 5, an EGR control signal C for the EGR solenoid device 12, a bypass control signal B for the bypass air flow rate control means 9 and the air-conditioner control signal D for the air-conditioner controller 19A are outputted from the electronic control unit 22.

At this juncture, it should be mentioned that a thermo-valve is usually installed in parallel with the bypass air flow control means 9, wherein the thermo-valve is driven in dependence on the cooling water temperature T such that the thermo-valve is operand to thereby allow the air to bypass the throttle valve 7 when the cooling water temperature T is lower than a predetermined temperature (i.e., when the engine is in a cold state), although the thermo-valve is not shown in FIG. 8.

Further, it should be added that the bypass flow varies in dependence on the manifold pressure Pb which changes as a function of the engine rotation speed (rpm) even when the cross-section area of the passage of the bypass air flow control means 9 or ISC solenoid is constant.

FIG. 9 is a block diagram showing in detail a functional configuration of the electronic control unit 22 schematically shown in FIG. 8. Referring to FIG. 9, the electronic control unit 22 includes a microcomputer 100 which is comprised of a CPU (Central Processing Unit) 200 for generating the various control signals J, C, B and D mentioned above on the basis of the engine operation state information Q, Pb, θ, T, I and A mentioned hereinbefore in accordance with predetermined programs, a free-running counter 201 for measuring a period of rotation cycle of the engine 1, a timer 202 for measuring timings and durations of the various controls, an analogue-to-digital converter (hereinafter referred to as the A/D converter) 203 for converting analogue input signals into digital signals, an input port 204, a RAM (Random Access Memory) 205 used as a work memory, a ROM (Read-Only Memory) 206 for storing various operation programs, an output port 207 for outputting the fuel injection control signal J, the exhaust gas recirculation control signal C, the bypass control signal B and the air-conditioner control signal D, and a common bus 208 for interconnecting the CPU 200 with the various components 201 to 207 mentioned above.

The electronic control unit 22 further includes a first input interface circuit 101 for shaping the ignition signal Q for the ignition coil 13 to thereby generate an interrupt signal to be inputted to the microcomputer 100. Thus, upon every generation of the ignition signal Q as the interrupt signal, the CPU 200 incorporated in the microcomputer 100 reads the count value from the counter 201 to calculate the rotation period of the engine 1 on the basis of a difference between the count values read out at the current time point and at a preceding time point, respectively. The engine rotation period thus determined is then stored in the RAM 205.

The electronic control unit 22 includes a second input interface circuit 102 which serves for acquiring the intake manifold pressure Pb, the throttle opening degree signal θ and the cooling water temperature signal T, respectively, from the pressure sensor 6, the throttle position sensor 8 and the water temperature sensor 17. These sensor signals are inputted to the A/D converter 203.

Further, the electronic control unit 22 includes a third input interface circuit 103 through which the idle signal I and the air-conditioner on/off signal A are acquired from the idle switch 18 and the air-conditioner on/off switch 19, respectively, to be supplied to the input port 204.

On the other hand, an output interface circuit 104 of the microcomputer 100 serves to receive the various control signals J, C, B and D from the output port 207 to thereby output these control signals to the fuel injector 5, the EGR solenoid device 12, the bypass air flow rate control means 9 and the air-conditioner controller 19A, respectively, after amplification and shaping of the control signals.

Next, the exhaust gas recirculation control operation of the conventional control system will be described by reference to FIGS. 8 and 9.

When the EGR solenoid device 12 is electrically energized in response to the EGR control signal C, a negative pressure is applied to a negative pressure chamber of the EGR control valve 11, as a result of which the EGR control valve 11 is opened, whereby a part of the engine exhaust gas is recirculated to be introduced into the engine 1.

On the other hand, when the EGR solenoid device 12 is turned off in response to the EGR control signal C, the atmospheric pressure is applied to the negative pressure chamber of the EGR control valve 11, which will result in closing of the EGR control valve 11 and hence inhibition of recirculation of the exhaust gas into the engine 1. In this manner, the EGR solenoid device 12 controls introduction of the exhaust gas to the engine 1 in response to the EGR control signal C.

The bypass control signal B for the bypass air flow rate control means 9 which may be constituted by an ISC solenoid valve device is supplied in the form of a pulse signal having a duty ratio which is controllable. Thus, when the duty ratio of the bypass control signal B is increased, the current flowing through linear solenoid type the bypass air flow rate control means 9 increases correspondingly. As a result of this, the flow area of the ISC solenoid valve device increases, whereby the cross sectional area of the air passage bypassing the throttle valve 7 is increased. In this manner, the bypass air flow rate can be controlled.

The engine load driving means incorporated in the electronic control unit 22 generates the air-conditioner control signal D for actuating the air conditioner when the air-conditioner on/off signal A indicates the command "ON" and when the engine operation state satisfies the condition which permits the air conditioner to be put into operation. On the other hand, when the air-conditioner on/off signal A commands the turn-off of the air conditioner, the air-conditioner control signal D for deenergizing the air conditioner is generated. In this way, the air conditioner is controlled with preference being put on the engine operation state with a view to protecting the engine against application of an excessively large load.

Next, description will turn to the operation of a hitherto known abnormality detecting apparatus for the exhaust gas recirculation or EGR control system implemented in the structure described above by reference to FIGS. 8 and 9 on the assumption, by way of example only, that the abnormality detecting operation is performed in the deceleration state of the engine. FIG. 10 is a flow chart for illustrating a conventional abnormality detection processing executed by the CPU 200 incorporated in the electronic control unit 22 for detecting occurrence of abnormality or fault in the EGR control system.

Referring to FIG. 10, in a step S101, it is checked from an engine rotation number Ne (rpm) determined previously on the basis of the ignition signal Q through a proper processing routine (not shown) and the idle signal I outputted from the idle switch 18 whether the engine rotation number Ne is higher than a predetermined value and whether the throttle valve 7 is in the fully closed state (i.e., the idle signal I is at the ON-level). When both the conditions mentioned above are satisfied, it is then decided that the motor vehicle is in the state of deceleration (i.e., the conditions prerequisite for making the decocion concerning occurrence of abnormality in the EGR control system are met).

When it is decided in the above-mentioned step S101 that the motor vehicle is not in the deceleration state (i.e., when the decision step S101 results in negation "NO"), the abnormality detection processing illustrated in FIG. 10 is terminated, as represented by "RETURN". In contrast, when the decision step S101 results in affirmation "YES", indicating that the motor vehicle is in the deceleration state, the processing proceeds to steps 102 et seq.

In the step S102, the EGR solenoid device 12 is electrically deenergized with the exhaust gas recirculation being intercepted or set to the EGR-off state, which is then followed by execution of the step S103 where the intake manifold pressure Pb in the EGR-off state is stored as a value PbOFF. (This value will hereinafter be referred to as the EGR-off intake manifold pressure value.) Parenthetically, it should be mentioned that in the deceleration state of the motor vehicle, the exhaust gas recirculation is usually invalidated. Accordingly, it is unnecessary to turn off forcibly or positively the EGR solenoid device 12.

Subsequently, in a step S104, the EGR solenoid device 12 is forcibly turned on to open the EGR control valve 11 for thereby validating the exhaust gas recirculation (i.e., set up the EGR-on state.) In a next step S105, the intake manifold pressure Pb is acquired in the EGR-on state to be stored as a value PbON. (This value will hereinafter be referred to as the EGR-on intake manifold pressure value).

In this conjunction, it will readily be understood that there will make appearance a difference between the EGR-off intake manifold pressure value PbOFF and the EGR-on intake manifold pressure value PbON so long as the EGR control system is operating normally without suffering any abnormality. Accordingly, in a step S106, a pressure difference ΔP between the EGR-on intake manifold pressure value PbON and the EGR-off intake manifold pressure value PbOFF is arithmetically determined in accordance with:

$$\Delta P = PbON - PbOFF$$

In succession, in a step S107, it is decided whether or not the intake manifold pressure difference ΔP mentioned above is greater than a preset reference value FAIL (representing a lower limit value of the intake manifold pressure difference ΔP in the normal state of the EGR system). When the result of the decision in the step S107 is affirmative or "YES" (i.e., when ΔP≧FAIL), this means that the intake manifold pressure difference ΔP has a normal value indicating the normal EGR state. Accordingly, in a step S108, it is decided that the EGR control system operates normally without suffering any abnormality.

On the other hand, when the decision result of the step S107 indicates that ΔP<FAIL (i.e., when the step S107 results in negation "NO"), this means that the intake manifold pressure difference ΔP does not reach the lower limit value of the normal pressure difference (i.e., exhaust gas recirculation is not normally carried out). Accordingly, decision is made in a step S109 that the EGR control system suffers abnormality.

Incidentally, when the engine deceleration state is decided in the step S101 mentioned above, the intake manifold pressure Pb can first be fetched in the EGR-off state (steps S102 and S103) without manipulating the EGR control valve 11 because the latter will normally have to be in the fully closed state when the motor vehicle is in the deceleration state. Subsequently, the EGR control valve 11 is forcibly set to the fully opened state for validating the exhaust gas recirculation by energizing the EGR solenoid device 12, whereon the intake manifold pressure PbON is measured in the EGR-on state (steps S104 and S105). However, because it is undesirable to terminate this routine in the state where the exhaust gas recirculation is effectuated, the processing is terminated in practice after the EGR control valve 11 is again set to the fully closed state (i.e., after the EGR-off state is regained).

In this conjunction, it should be mentioned that when the EGR control valve 11 is in the fully closed state (i.e., in the EGR-off state), the intake manifold pressure Pb is normally on the order of 260 mmHg, while when the exhaust gas is forcibly introduced into the engine with the EGR control valve 11 being fully opened (i.e., in the EGR-on state), the intake manifold pressure Pb amounts to circa. 460 mmHg because of a steep increase in the flow rate of the intake air introduced into the engine 1, although it depends on the specifications of the engine and the operation states thereof.

Thus, the intake manifold pressure difference ΔP calculated in the step S106 will assume a value of about 200 (=460−260) mmHg. Under the circumstances, the preset decision value "FAIL" used as the reference value in the comparison at the step S107 should preferably be set at, for example, 100 mmHg so that it can definitely be discriminated from the normal value (200 mmHg) of the intake manifold pressure difference ΔP.

As can be seen from the foregoing, abnormality detection for the EGR control system can be realized by making use of the fact that difference in the quantity of the intake air (i.e., difference between the fresh intake air and a sum of the recirculated exhaust gas and the fresh intake air) is reflected onto the intake manifold pressure Pb. Of course, occurrence of abnormality in the EGR control system as detected in this way may be informed to the driver by turning on, for example, an alarm lamp or the like device through an appropriate processing routine (not shown).

Next, assuming that the engine is in the stable state, an abnormality detection processing for the EGR control system known heretofore will be described by reference to a flow chart of FIG. 11.

Referring to the figure, in a step S211, it is checked on the basis of the engine rotation number Ne (rpm) and the throttle opening degree θ whether deviations (changes) in the engine rotation number Ne and the throttle opening degree θ, respectively, are smaller than or equal to respective preset reference values, to thereby decide whether or not the engine or the motor vehicle is in the stable state (i.e., whether the condition prerequisite to the decision of occurrence of a fault in the EGR control system in the stable state is satisfied or not).

When the decision step S201 results in negation "NO", indicating that the motor vehicle is not in the stable state, the abnormality detection processing routine illustrated in FIG. 11 is terminated (RETURN). On the contrary, when the answer of the decision step S201 is affirmative "YES", indicating that the engine is in the stable operation state, the processing proceeds to steps S212 et seq. (corresponding to those S102 et seq. shown in FIG. 10).

In the step S212, the EGR solenoid device 12 is activated to validate the exhaust gas recirculation, whereupon the intake manifold pressure Pb in the EGR-on state is stored as the EGR-on intake manifold pressure value PbON. Parenthetically, it should be mentioned that since the exhaust gas recirculation is validated already when the motor vehicle is in the stable state, there exists no necessity for positively actuating the EGR solenoid device 12 for controlling the EGR control valve.

Subsequently, in a step S214, the EGR solenoid device 12 is forcibly turned off to thereby invalidate positively the exhaust gas recirculation, which is then followed by a step S215 where the intake manifold pressure Pb in the EGR-off state is stored as the EGR-off intake manifold pressure value PbOFF.

In this case, there will equally make appearance a difference between the EGR-off intake manifold pressure value PbOFF and the EGR-on intake manifold pressure value PbON so long as the exhaust gas recirculation control system is operating normally. Accordingly, in a step S216, a pressure difference ΔP between the EGR-on intake manifold pressure value PbON and the EGR-off intake manifold pressure value PbOFF in the stable or steady engine is arithmetically determined in accordance with:

$$\Delta P = PbON - PbOFF$$

In succession, in a step S217, it is decided whether or not the intake manifold pressure difference ΔP mentioned above is greater than a preset reference value "FAIL" (indicating a lower limit of the intake manifold pressure difference ΔP so long as the normal exhaust gas recirculation is normal). When the result of the decision in the step S217 is affirmative or "YES" (i.e., when ΔP≧FAIL), this means that the intake manifold pressure difference ΔP has a normal value (indicating absence of abnormality in the exhaust gas recirculation). Accordingly, in a step S218, it is decided that the EGR control system operates normally without suffering any abnormality in the stable engine operation state.

On the other hand, when the decision result of the step S217 indicates that ΔP<FAIL (i.e., when it results in negation "NO"), this means that the intake manifold pressure difference ΔP does not reach the lower limit value of the normal pressure difference range (i.e., exhaust gas recirculation is not effected normally). Accordingly, decision is made in a step S219 that the exhaust gas recirculation control system suffers abnormality.

Parenthetically, when the stable state is decided in the step S211 as mentioned above, this means that the EGR control valve 11 is opened at a predetermined aperture value. Accordingly, the intake manifold pressure Pb in the EGR-on state (i.e., the EGR-on intake manifold pressure value PbON) is first acquired (steps S212 and S213). Subsequently, the EGR control valve 11 is forcibly closed fully by actuating the EGR solenoid device 12 (i.e., the exhaust gas recirculation is invalidated), whereupon the intake manifold pressure Pb is acquired as the EGR-off intake manifold pressure value (steps S214 and S215).

At this juncture, it should be mentioned that change in the flow rate of the intake air in the stable state is smaller than that in the deceleration state mentioned previously, because the EGR control valve 11 is fully closed from the state where the EGR control valve 11 is opened at a predetermined value (i.e., from the EGR-on state). This will be explained below.

Let's assume, by way of example, that the EGR ratio (corresponding to the opening degree of the EGR control valve 11) in the stable state is 10% and that the intake manifold pressure Pb in this state is 400 mmHg. Then, the EGR-off intake manifold pressure value PbOFF in the fully closed state (i.e., no EGR state) can be given as follows:

$$PbOFF = 400 - 400 \times 0.1$$
$$= 360 \text{ [mmHg]}$$

Thus, the intake manifold pressure difference ΔP calculated in the step S216 is 40 mmHg (=400−360 mmHg). Consequently, the predetermined value "FAIL" referenced in the comparison step S217 is set about 20 mmHg so that it can definitely be distinguished from the normal value (40 mmHg) of the intake manifold pressure difference value ΔP.

It should further be mentioned that a processing routine for detecting change or variation of the stable state of the engine 1 is provided, although it is not shown, and activated as an interruption processing periodically at every predetermined time interval for sampling the engine rotation number Ne and the throttle opening degree θ for the purpose of detecting change in the stable state on the basis of differences of these parameters before and after the sampling point, respectively. When occurrence of the change in the stable state is detected, the abnormality detecting routine for the exhaust gas recirculation control system illustrated in FIG. 11 is terminated.

Of course, in the case of the abnormality detecting routine illustrated in FIG. 11, the occurrence of abnormality in the EGR control system can be detected by executing a plurality of processing steps mentioned above by making use of the fact that variation or change in the intake air flow introduced to the engine 1 is reflected onto the intake manifold pressure Pb. Besides, it goes without saying that a processing for turning on an alarm lamp may be performed on the basis of the result of the fault detection processing for informing the driver or operator of the abnormality of the EGR control system.

Next, paying attention to the operation of the bypass air flow rate control means 9, a control operation known heretofore for controlling a bypass air flow rate Qb in the deceleration state of the engine will be described by reference to a timing chart of FIG. 12 which graphically illustrates a relation between a deceleration flag and the bypass air flow rate Qb as well as change of the latter as a function of time lapse.

At first, it assumed that the engine or motor vehicle is in the running state and that the deceleration flag is set to "0" (indicating that the motor vehicle is not in the deceleration state). In this case, the bypass air flow rate Qb is so controlled as to assume a substantially constant value which is essentially determined by the throttle opening degree θ. On the other hand, after the time point t0 at which the deceleration flag is set to "1" (indicating the deceleration state), the bypass air flow rate Qb is arithmetically determined periodically at a predetermined time interval in accordance with the following expression:

$$Qb_n = Qb_{n-1} - \beta$$

In the above expression, $Qb_n$ represents a bypass air flow rate at a current time point (hereinafter referred to as the current bypass air flow rate), $Qb_{n-1}$ represents a bypass air flow rate at a preceding time point (hereinafter referred to as the preceding bypass air flow rate), and β represents a predetermined value. As can be seen from the above expression, the bypass air flow rate Qb decreases progressively as a function of time lapse in the deceleration state, as illustrated in FIG. 12. Incidentally, the bypass air flow rate (Qb) decreasing operation mentioned above is generally known as what is called a dashpot operation.

Additionally, it should be mentioned that when an engine load is connected, e.g. upon actuation of the air conditioner, the bypass air flow rate Qb is increased in response to the air-conditioner control signal D. More specifically, the electronic control unit 22 outputs the air-conditioner control signal D to the air-conditioner controller 19A to place the air conditioner in the operating state, while the intake air flow rate is increased to ensure the generation of a demanded output torque by the engine 1.

At this juncture, it is to be recalled that occurrence of abnormality in the EGR control system is decided on the basis of the pressure difference ΔP in the intake manifold pressure Pb between the EGR-off state and the EGR-on state.

Consequently, when the abnormality decision for the EGR control system is performed in the deceleration state as described hereinbefore by reference to FIG. 10, the intake manifold pressure difference ΔP as detected may assume different values in dependence on difference of the deceleration state such as difference between a steep deceleration and a gentle or slow deceleration, leading to an erroneous fault detection in the worst case.

Further, when the engine 1 is in the cold state, the thermo-valve (not shown) which is installed in parallel to the bypass air flow rate control means 9, as mentioned previously, is opened, the intake manifold pressure Pb tends to vary during deceleration of the engine, which may result in erroneous detection of abnormality of the EGR control system.

Furthermore, when the abnormality detection is performed in the state where the EGR control valve 11 is not sufficiently warmed up, there may arise such situation that the EGR control valve 11 does not operate at all or operate only slowly because of rather rigid temperature characteristic of a diaphragm constituting a value element of the EGR control valve 11, which may results in ineffective pressure difference ΔP of the intake manifold pressure Pb, leading possibly to an erroneous abnormality detection in the worst case.

By way of example, when the ambient temperature is low and when the exhaust gas recirculating operation is not performed at all since the start of the engine, the diaphragm of the EGR control valve 11 is not sufficiently warmed up. In that case, there may happen such situation that the EGR control valve 11 dose not operate or operate only slowly, giving rise to no appearance of the difference ΔP in the intake manifold pressure Pb between the EGR-on state and the EGR-off state.

In this conjunction, it is noted that the diaphragm of the EGR control valve 11 is usually made of fluorine rubber because of inexpensiveness. The diaphragm made of fluorine rubber exhibits such temperature characteristic that it starts to be hardened at a temperature of about 0° C. and becomes substantially solidified at a temperature of about −10° C. In that case, the EGR control valve 11 will not operate even when the EGR solenoid device 12 is electrically energized or can operate only slowly.

By contrast, if the EGR control valve 11 was opened once after the start of the engine, passage of the EGR gas of a temperature not lower than 100° C. through the EGR control valve 11 even in a small amount will allow the fluorine rubber diaphragm of the EGR control valve 11 to operate at a high-speed response.

As will now be apparent from the foregoing description, in the hitherto known abnormality detection apparatus for the exhaust gas recirculation control system of the internal combustion engine in which no consideration is paid to the temperature of the EGR control valve 11, there may arise a problem that error will result in the abnormality detection of the EGR control system, when the detection is performed in the state in which the EGR control valve 11 is not warmed up sufficiently for the diaphragm of the valve 11 to operate at high-speed response.

Furthermore, in the cold state of the engine, the thermo-valve mentioned hereinbefore is opened, as a result of which error is involved in the intake manifold pressure Pb as measured, giving rise to a problem that abnormality of the EGR control system will erroneously be detected.

Besides, erroneous detection of abnormality of the EGR control system will be incurred due to difference in the deceleration state of the engine or difference in the bypass air flow, when the EGR control system is diagnosed in the engine deceleration state.

SUMMARY OF THE INVENTION

In the light of the state of the art described above, it is an object of the present invention to solve the problems such as mentioned above by providing an abnormality detecting apparatus for an exhaust gas recirculation control system of an internal combustion engine, which apparatus is essentially immune to the influences of temperature characteristics of a diaphragm constituting a part of the exhaust gas recirculation control valve.

Another object of the present invention is to provide an abnormality detecting apparatus for an exhaust gas recirculation control system of an internal combustion engine, which apparatus can perform an abnormality detection with high accuracy and reliability regardless of changes in the deceleration state and the bypass air flow rate which are adopted as the conditions prerequisite for enabling the abnormality decision.

It is yet another object of the present invention to provide an abnormality detecting apparatus for an exhaust gas recirculation control system of an internal combustion engine, which apparatus is essentially immune to erroneous detection due to variation or change in the intake manifold pressure as brought about by the air flow bypassing a throttle valve by way of a thermo-valve.

A further object of the present invention is to provide a method of detecting occurrence of abnormality in an exhaust gas recirculation control system of an internal combustion engine, which method can be carried out by using a correspondingly programmed microcomputer.

In view of the above and other objects which will become apparent as the description proceeds, there is provided according to a first aspect of the present invention an abnormality detecting apparatus for detecting occurrence of abnormality in an exhaust gas recirculation control system of an internal combustion engine, which apparatus includes an intake pipe/manifold for feeding air to the internal combustion engine, a throttle valve disposed in the intake pipe/manifold to be selectively opened and closed for regulating a flow rate of the air supplied to the internal combustion engine, an exhaust gas recirculation pipe for introducing an exhaust gas of the internal combustion engine to the intake pipe means at a location downstream of the throttle valve for recirculating the exhaust gas through the internal combustion engine, an exhaust gas recirculation valve disposed in the exhaust gas recirculation pipe for regulating a recirculation flow rate of the exhaust gas flowing through the exhaust gas recirculation pipe, sensors for detecting operation state of the internal combustion engine to thereby output engine operation state information inclusive of information concerning intake air pressure within the intake air pipe/manifold, an exhaust gas recirculation control means for controlling the exhaust gas recirculation valve in dependence on the engine operation state information supplied from the sensors, an abnormality decision enabling condition detecting means for detecting satisfaction of an abnormality decision enabling condition for enabling a decision concerning occurrence of abnormality in the exhaust gas recirculation control means on the basis of the engine operation state information, an enforcive valve opening/closing means for forcibly opening and closing the exhaust gas recirculation valve during a period in which the abnormality decision enabling condition is satisfied, and an abnormality decision means for deciding whether abnormality occurs in the exhaust gas recirculation control system on the basis of the intake air pressures detected within the intake pipe/manifold upon enforcive opening/closing of the exhaust gas recirculation valve. The abnormality decision enabling condition detecting means includes an exhaust gas recirculation duration time measuring means for measuring a temporal period during which the exhaust gas recirculation valve is maintained in the opened state after starting of the internal combustion engine. The decision as to occurrence of abnormality in the exhaust gas recirculation control system is enabled when the abnormality decision enabling condition detecting means detects as the abnormality decision enabling condition that the aforementioned temporal period attains or exceeds a predetermined temporal value.

With the arrangement of the abnormality detecting apparatus described above, the abnormality detection processing is effected only after the exhaust gas recirculation valve is sufficiently warmed up. Thus, the erroneous abnormality detection due to the temperature characteristic of the diaphragm constituting the exhaust gas recirculation valve can positively be excluded.

In a preferred mode for carrying out the invention, the abnormality detecting apparatus may further include a bypass air flow rate control means for controlling rate of bypass air flow which bypasses the throttle valve. In that case, as the engine operation state information, the engine rotation number, the fully-closed state of the throttle valve and the bypass air flow rate are utilized. The abnormality decision enabling condition detecting means detects the deceleration state of the internal combustion engine on the basis of the engine rotation number and the fully closed state of the throttle valve as the abnormality decision enabling conditions. The abnormality decision means includes an intake air pressure correcting means for correcting the intake air pressures detected within the intake pipe/manifold upon enforcive opening/closing of the exhaust gas recirculation valve with the engine rotation number and the bypass air flow rate detected upon enforcive opening/closing of the exhaust gas recirculation valve, and an exhaust gas recirculation ratio equivalent value arithmetic means for arithmetically determining an exhaust gas recirculation ratio equivalent value corresponding to the exhaust gas recirculation flow rate on the basis of the corrected intake manifold pressure. The exhaust gas recirculation ratio equivalent value is then compared with an abnormality decision reference value to thereby decide whether abnormality occurs in the exhaust gas recirculation control means.

By virtue of the arrangement that the intake air pressure is corrected with the engine rotation number and the bypass air flow in the exhaust gas recirculation off-and on-states, and that the abnormality detection is performed by using the exhaust gas recirculation ratio equivalent value calculated on the basis of the corrected intake manifold pressures, as described above, the exhaust gas recirculation ratio equivalent value can avoid any noticeable error, whereby the abnormality can be detected with high reliability. Besides, the abnormality detection of high accuracy can be ensured even in the deceleration state of the engine.

Further provided according to a second aspect of the invention is an abnormality detecting apparatus for detecting occurrence of abnormality in an exhaust gas recirculation system of an engine, which includes an intake pipe means for feeding air to the internal combustion engine, a throttle valve disposed in the intake pipe/manifold to be selectively opened and closed for regulating a flow of the air supplied to the internal combustion engine through the intake pipe/manifold, a bypass air flow rate control means for controlling rate of bypass air flow which bypasses the throttle valve, an exhaust Gas recirculation pipe for introducing an exhaust gas of the internal combustion engine to the intake pipe means at a location downstream of the throttle valve for recirculating the exhaust gas through the internal combustion engine, an exhaust gas recirculation valve disposed in the exhaust gas recirculation pipe for regulating a recirculation flow rate of the exhaust gas flowing through the exhaust gas recirculation pipe, sensors for detecting operation state of the internal combustion engine to thereby output engine operation state information inclusive of information concerning an intake air pressure within the intake pipe/manifold, an exhaust gas recirculation control means for controlling the exhaust gas recirculation valve in dependence on the engine operation state information supplied from the sensor means, an abnormality decision enabling condition detecting means for detecting satisfaction of an abnormality decision enabling condition for enabling a decision concerning occurrence of abnormality in the exhaust gas recirculation control system on the basis of the engine operation state information, an enforcive valve opening/closing means for forcibly opening and/or closing the exhaust gas recirculation valve during a period in which the abnormality decision enabling condition is satisfied, and an abnormality decision means for deciding whether abnormality occurs in the exhaust gas recirculation control system on the basis of the intake manifold pressures detected within the intake pipe means upon enforcive opening/closing of the exhaust gas recirculation valve. In this case, as the engine operation state information, the engine rotation number, the fully-closed state of the throttle valve and the bypass air flow rate are used. The abnormality decision enabling condition detecting means detects deceleration state of the internal combustion engine on the basis of the engine rotation number and the fully closed state of the throttle valve as the abnormality decision enabling conditions. The abnormality decision means includes an intake air pressure correcting means for correcting the intake air pressure detected within the intake pipe/manifold upon enforcive opening/closing of the exhaust gas recirculation valve with the engine rotation numbers detected upon enforcive opening/closing of the exhaust gas recirculation valve, and the exhaust gas recirculation ratio equivalent value arithmetic means for arithmetically determining an exhaust gas recirculation ratio equivalent value corresponding to the exhaust gas recirculation flow rate on the basis of the corrected intake manifold pressure and the bypass air flow rate detected upon closing of the exhaust gas recirculation valve. The exhaust gas recirculation ratio equivalent value is then compared with an abnormality decision reference value to thereby decide whether abnormality occurs in the exhaust gas recirculation control means.

By virtue of the arrangement that the intake manifold pressure is corrected with the engine rotation number in the exhaust gas recirculation off and on states, wherein the abnormality detection is performed by using the exhaust gas recirculation ratio equivalent value calculated on the basis of the corrected intake manifold pressure and the bypass air flow detected upon closing of the exhaust gas recirculation valve, as described above, the exhaust gas recirculation ratio equivalent value can avoid any noticeable error, whereby the abnormality can be detected with high reliability. Besides, the abnormality detection of high accuracy can be ensured even in the deceleration state of the engine.

In another preferred mode for carrying out the invention, the engine may further include a thermo-valve for bypassing air flow across the throttle valve when the cooling water temperature is lower than a predetermined temperature. In that case, as the engine operation state information, the cooling water temperature is used. Decision as to occurrence of abnormality in the exhaust gas recirculation control means is enabled when the abnormality decision enabling condition detecting means detects as the abnormality decision enabling condition that the cooling water temperature is higher than the predetermined temperature.

Owing to the arrangement mentioned above, not only erroneous abnormality detection due to the temperature characteristic of the diaphragm of the exhaust gas recirculation valve can be evaded but also error brought about by variation in the intake air pressure due to the bypass air flowing through the thermo-valve can be suppressed. Thus, abnormality of the exhaust gas recirculation control system can be detected with enhanced accuracy and reliability.

Furthermore, according to a third aspect of the invention, there is provided an abnormality detecting apparatus for detecting occurrence of abnormality in an exhaust gas recirculation system of an engine, which apparatus includes an intake pipe means for feeding air to the internal combustion engine, a throttle valve disposed in the intake pipe means to be selectively opened and closed for regulating a flow of the air supplied to the internal combustion engine through the intake pipe means, an exhaust gas recirculation pipe for introducing an exhaust gas of the internal combustion engine to the intake pipe means at a location downstream of the throttle valve for thereby recirculating the exhaust gas through the internal combustion engine, an exhaust gas recirculation valve disposed in the exhaust gas recirculation pipe for regulating a recirculation flow rate of the exhaust gas flowing through the exhaust gas recirculation pipe, sensors for detecting operation state of the internal combustion engine, to thereby output engine operation state information inclusive of information concerning intake air pressure within the intake pipe/manifold and cooling water temperature, a thermo-valve means for bypassing air flow across the throttle valve when the cooling water temperature is lower than a predetermined temperature, an exhaust gas recirculation control means for controlling the exhaust gas recirculation valve in dependence on the engine operation state information supplied from the sensor means, an abnormality decision enabling condition detecting means for detecting satisfaction of an abnormality decision enabling condition for enabling a decision concerning occurrence of abnormality in the exhaust gas recirculation control system on the basis of the engine operation state information, an enforcive valve opening/closing means for forcibly opening/closing the exhaust gas recirculation valve during a period in which the abnormality decision enabling condition is satisfied, and an abnormality decision means for deciding whether abnormality occurs in the exhaust gas recirculation control means on the basis of the intake manifold pressures detected upon enforcive closing of the exhaust gas recirculation valve. The abnormality decision enabling condition detecting means detects as the abnormality decision enabling condition that the cooling water temperature is higher than the predetermined temperature.

With the arrangement of the abnormality detecting apparatus in which the abnormality detection is inhibited when the engine is in the cold state, error brought about by variation in the intake manifold pressure due to the bypass air flowing through the thermo-valve can be suppressed. Thus, abnormality of the exhaust gas recirculation control system can be detected with enhanced accuracy and reliability.

In conjunction with the exhaust gas recirculation control systems mentioned above, there is provided according to a further aspect of the present invention an abnormality detecting method which includes the steps of deciding whether a temporal period during which the exhaust gas recirculation valve has continued to be opened after starting of the engine attains or exceeds a preset value, deciding on the basis of state of the throttle valve and engine rotation speed fetched through the sensor means whether the engine is in deceleration state only when it is decided that the temporal period attains or exceeds the preset value, closing the exhaust gas recirculation valve by means of the exhaust gas recirculation control means when it is decided in the above step that the engine is in the deceleration state, acquiring through the sensor means a first intake air pressure within the intake pipe means in the state where the exhaust gas recirculation valve is closed, opening the exhaust gas recirculation valve, acquiring through the sensor means a second intake air pressure within the intake pipe means in the state where the exhaust gas recirculation valve is opened, determining an intake pressure difference between the first and second intake air pressures, comparing the intake pressure difference with a predetermined reference value, and deciding occurrence of abnormality in the exhaust gas recirculation control when the intake pressure difference is smaller than the predetermined reference value.

According to yet further aspect of the invention, there is provided an abnormality detecting method which includes the steps of deciding whether a temporal period during which the exhaust gas recirculation valve has continued to be opened after starting of the engine attains or exceeds a preset value, deciding on the basis of state of the engine operation state information acquired through the sensor means whether the engine is in stable state when it is decided that the temporal period attains or exceeds the preset value, opening the exhaust gas recirculation valve when the engine is in the stable state, acquiring through the sensor means a first intake air pressure within the intake pipe means in the state where the exhaust gas recirculation valve is opened, closing the exhaust gas recirculation valve by means of the exhaust gas recirculation control means, acquiring through the sensor means a second intake air pressure within the intake pipe means in the state where the exhaust gas recirculation valve is closed, determining an intake pressure difference between the first and second intake air pressures, comparing the intake pressure difference with a predetermined reference value, and deciding occurrence of abnormality in the exhaust gas recirculation when the intake pressure difference is smaller than the predetermined reference value.

Furthermore provided according to still further aspect of the invention is a method of detecting occurrence of abnormality in an exhaust gas recirculation control system of an internal combustion engine, which method includes the steps of deciding whether the temperature of the engine cooling water is lower than a preset value, deciding on the basis of state of the throttle valve and engine rotation speed acquired through the sensor means whether the engine is in deceleration state when it is decided that the engine cooling water temperature is lower than the preset value, closing the exhaust gas recirculation valve by means of the exhaust gas recirculation control means when it is decided in the above-mentioned step that the engine is in the deceleration state, acquiring through the sensor means a first intake air pressure within the intake pipe means in the state where the exhaust gas recirculation valve is closed, opening the exhaust gas recirculation valve, acquiring through the sensor means a second intake air pressure within the intake pipe means in the state where the exhaust gas recirculation valve is opened, determining an intake pressure difference between the first and second intake air pressures, comparing the intake pressure difference with a predetermined reference value, and deciding occurrence of abnormality in the exhaust gas recirculation when the intake pressure difference is smaller than the predetermined reference value.

The abnormality detecting methods can enjoy advantageous effects mentioned hereinbefore. Further, the method can be carried out automatically by using a correspondingly programmed microcomputer.

In the abnormality detecting apparatus and methods described the corrected intake pressure difference can be determined in accordance with the expression (1) mentioned hereinafter, while the exhaust gas recirculation ratio equivalent values can be determined in accordance with the expression (2) or (3) also mentioned later on.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Figure 1:
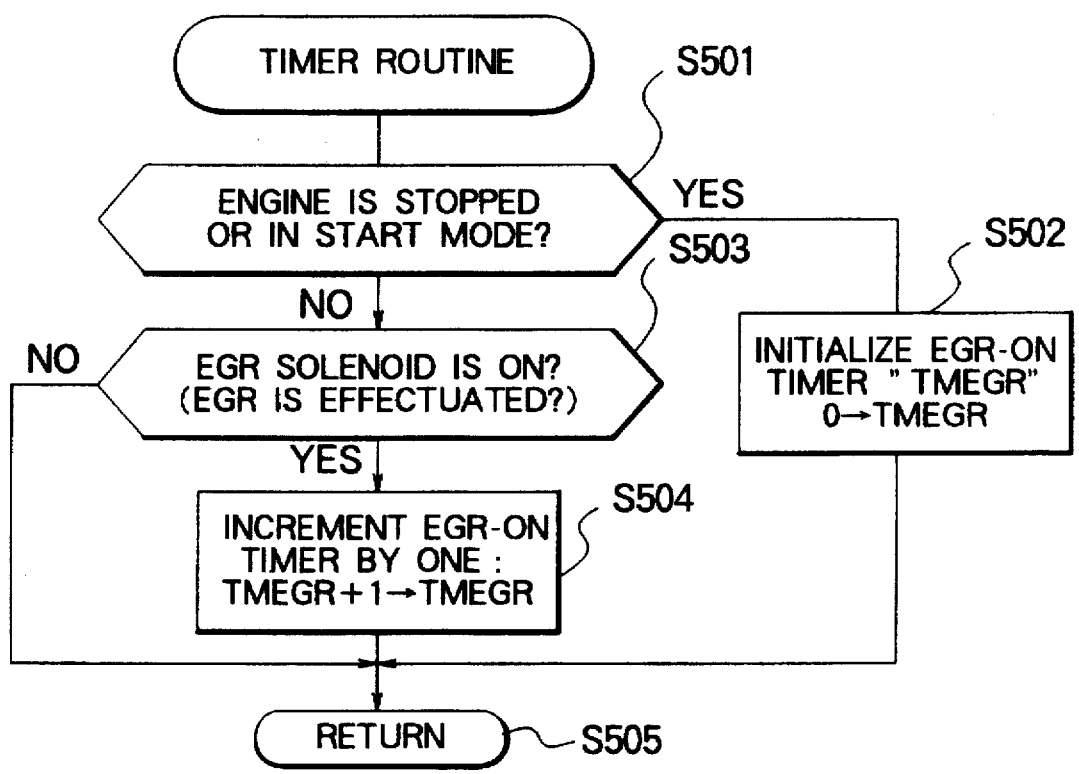
FIG. 1 is a flow chart for illustrating a time routine processing according to a first embodiment of the present invention.

Now, the present invention will be described in detail in conjunction with preferred or exemplary embodiments thereof by reference to the drawings. In the following description, like or equivalent parts are designated by like reference characters throughout the several figures.

Embodiment 1

An abnormality detecting apparatus for an exhaust gas recirculation control system (hereinafter also referred to as an EGR control system) for an internal combustion engine (also referred to simply as an engine) according to a first embodiment of the invention will be described below. In the first place, it should be mentioned that configuration of the EGR control system in which the present invention can find application as well as that of an electronic control unit employed for carrying out the EGR control are substantially identical with those shown in FIGS. 8 and 9, respectively. It should however be noted that the abnormality decision enabling condition detecting means incorporated in the electronic control unit 22 includes a temporal period measuring means for measuring an EGR-on duration time or period TMEGR during which the EGR valve 11 continues to be in the opened state after the start of the engine, wherein the EGR-on duration time TMEGR exceeding a predetermined value XTEGR constitutes a condition for enabling the abnormality detection or decision processing.

Now, description will be made of an abnormality detecting operation for the EGR control system of an engine according to the first embodiment of the present invention by reference to FIGS. 1 to 3.

FIG. 1 shows a timer routine processed by the temporal period measuring timer means for measuring the EGR-on duration time TMEGR, which routine is executed periodically at a predetermined time interval.

Referring to the figure, in a step S501, it is decided through a relevant processing routine (not shown) whether the engine 1 is stopped or in a starting mode. When execution of this decision step S501 results in affirmation "YES", indicating that the engine is stopped or in the starting mode, the processing then proceeds to a step S502 where a timer for measuring the EGR-on duration time TMEGR during which the EGR control valve 11 remains in the opened state (EGR-on state) after the start of the engine is initialized to zero.

On the other hand, when it is decided in the step S501 that the engine is not in the starting mode (i.e., when the step S501 results in negation "NO"), the processing proceeds to a step S503 where decision is made whether or not the EGR solenoid device 12 is in the operative state (this state will be referred to as the EGR-on state).

When the decision step S503 results in negation "NO", indicating that the EGR solenoid device 12 is not in the EGR-on state (i.e., this state will hereinafter be referred to as the EGR-off state), the processing proceeds to a return step S505 where the timer routine shown in FIG. 1 is terminated without executing the following step S504.

By contrast, when it is decided in the step S503 that the EGR solenoid device 12 is in the on-state (i.e., when the answer of this step is "YES"), the processing proceeds to the step S504 where the timer or counter for measuring the EGR-on duration time TMEGR is incremented, whereupon the timer routine shown in FIG. 1 comes to an end.

Figure 2:
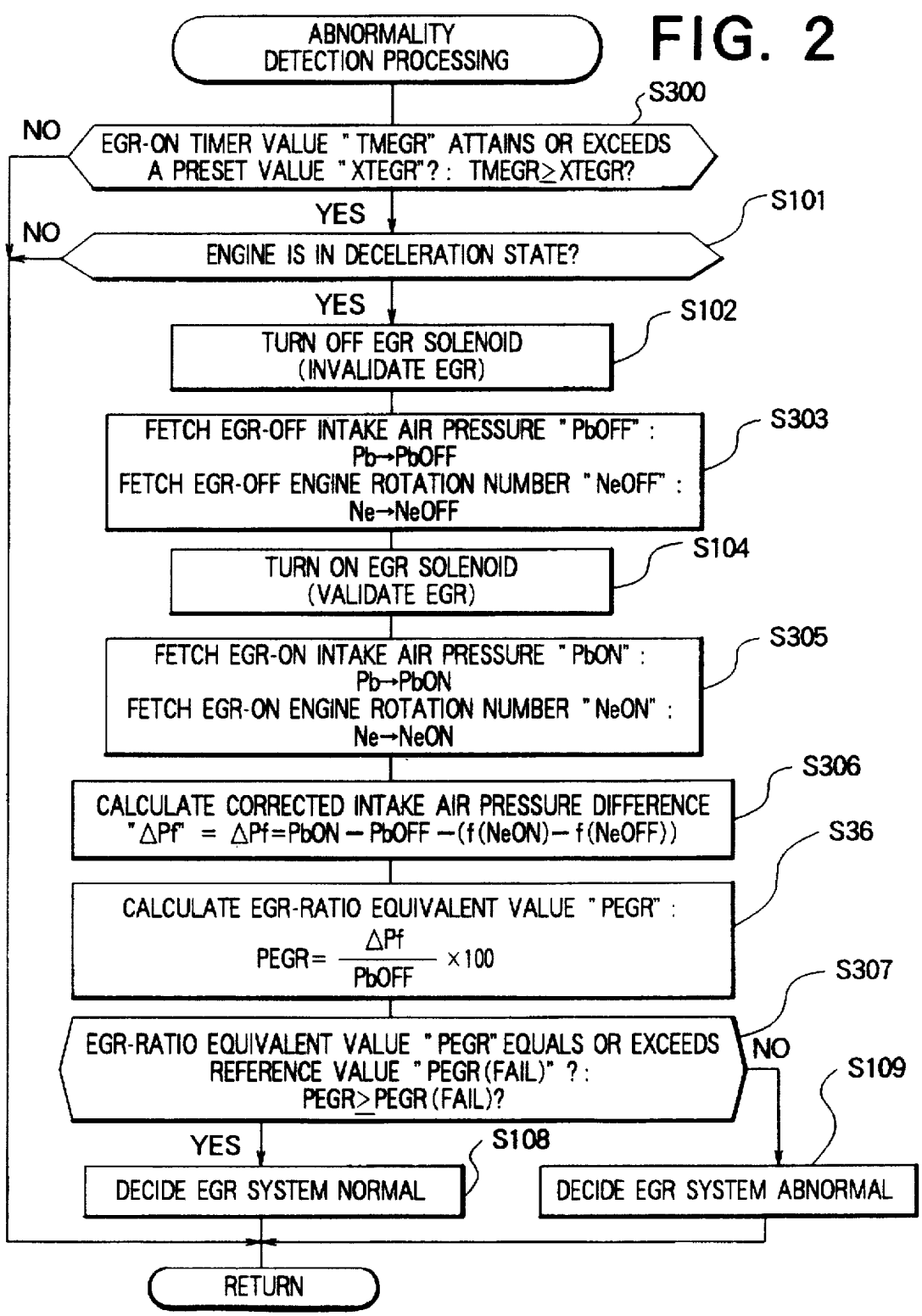
FIG. 2 is a flow chart for illustrating an abnormality detection processing performed for an exhaust gas recirculation control system during engine deceleration according to the first embodiment of the invention.

Now, assuming that the deceleration state of the engine is adopted as the condition for enabling the abnormality detecting processing, the abnormality detection is performed in accordance with a processing routine shown in FIG. 2. In this conjunction, it should be noted that an additional decision step S300 is inserted in this processing routine for the purpose of detecting the condition for enabling the abnormality detection. More specifically, in this step S300, it is decided whether the EGR-on duration time TMEGR determined through the timer routine shown in FIG. 1 exceeds a predetermined time XTEGR after the start of the engine. Unless the EGR-on duration time TMEGR exceeds this reference value XTEGR, the abnormality detection processing shown in FIG. 2 is terminated.

Figure 10:
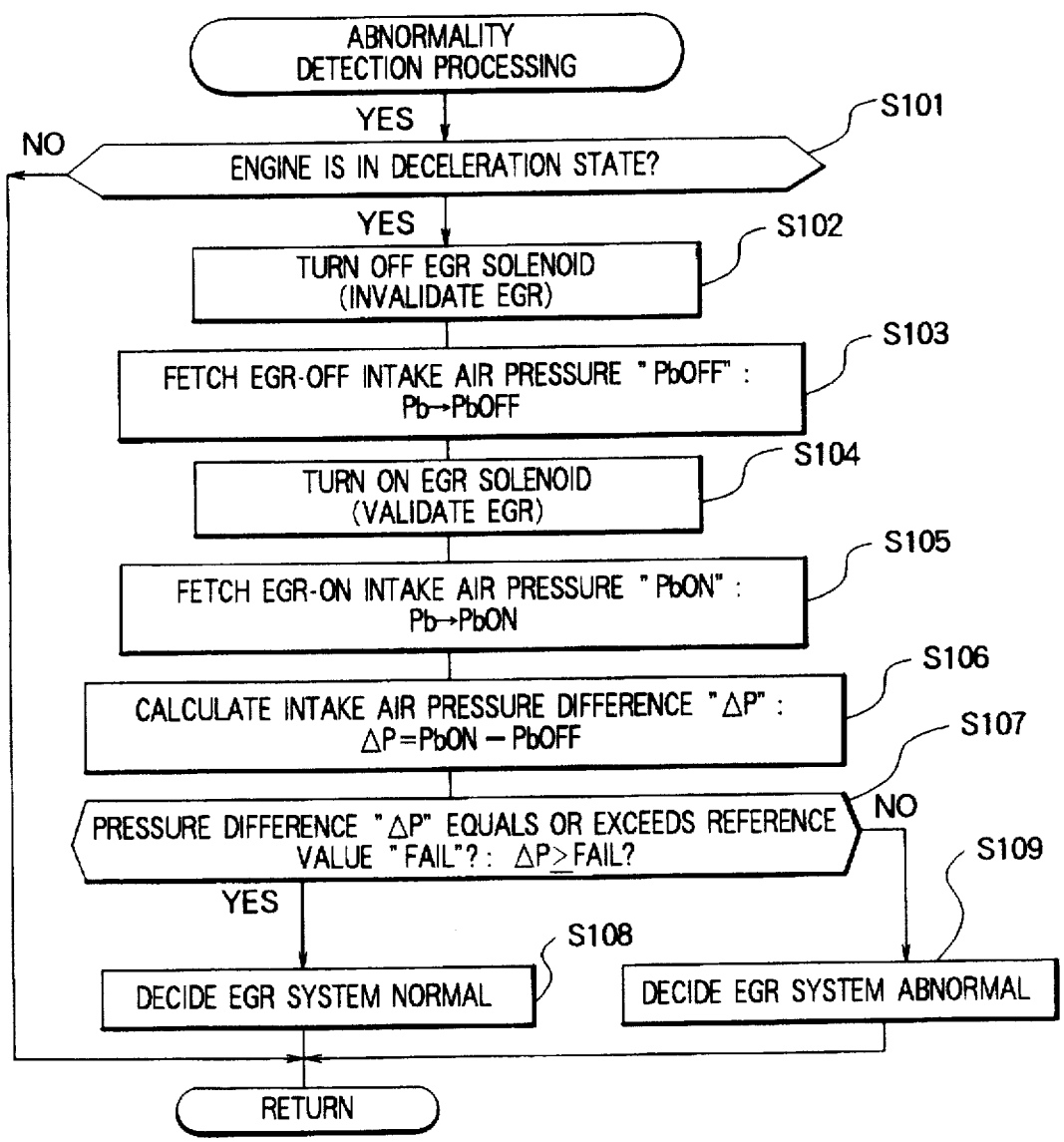
FIG. 10 is a flow chart for illustrating a conventional processing for detecting occurrence of abnormality in an exhaust gas recirculation control system of an internal combustion engine in a deceleration state thereof.

Parenthetically, steps S303, S305 and S307 shown in FIG. 2 functionally correspond, respectively, to the steps S103, S105 and S107 described hereinbefore by reference to FIG. 10 while the other steps S101, S102, S104, S108 and S109 shown in FIG. 2 are essentially same as those indicated by 25 using the same reference characters in FIG. 10.

Figure 3:
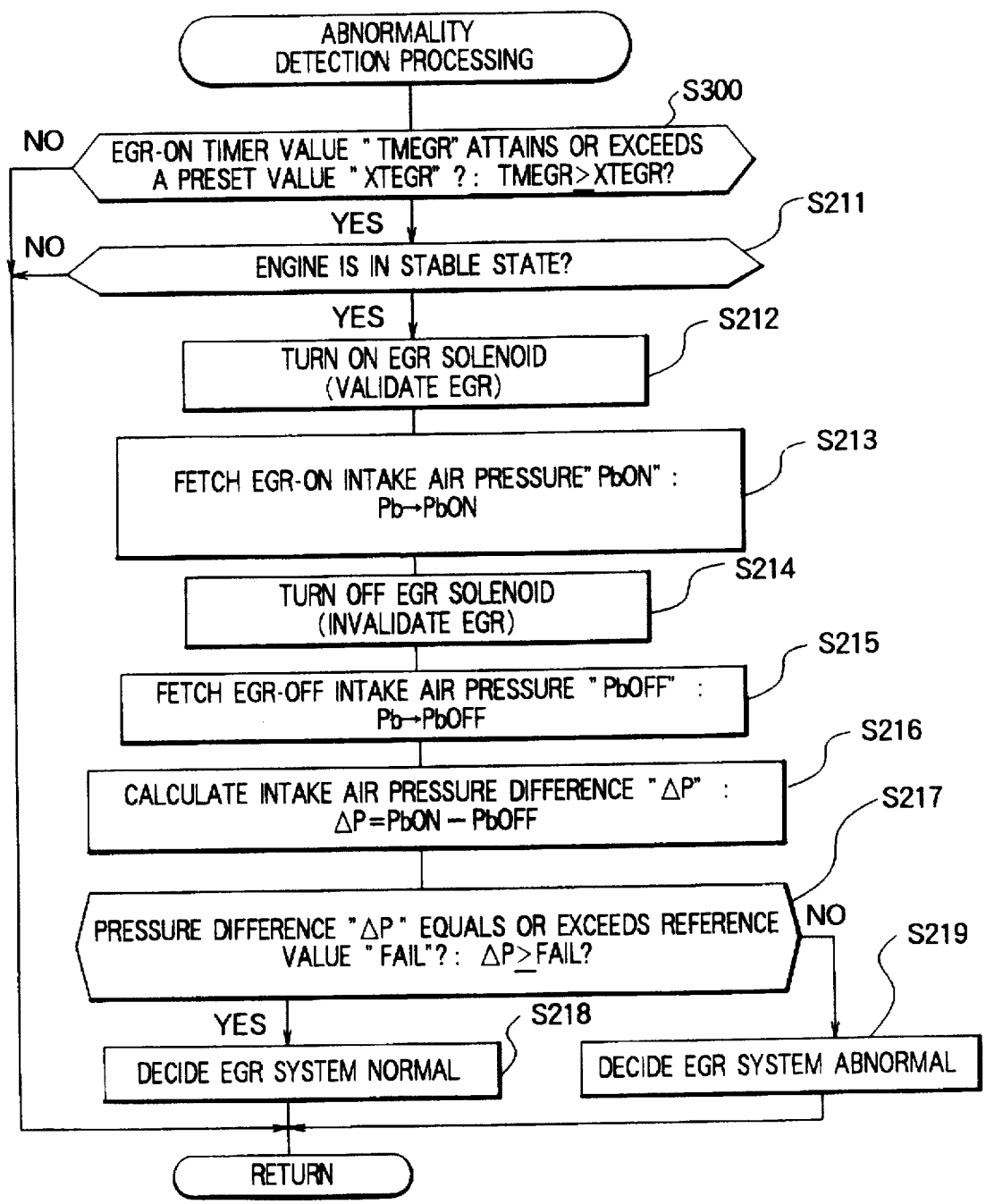
FIG. 3 is a flow chart for illustrating an abnormality detection processing operation at a stable state for an exhaust gas recirculation control system in a stable engine state according to the first embodiment of the invention.

On the other hand, when the stable state of the engine is adopted as the condition for enabling the abnormality detecting processing, the abnormality detection is performed in accordance with processing routine shown in FIG. 3.

Figure 11:
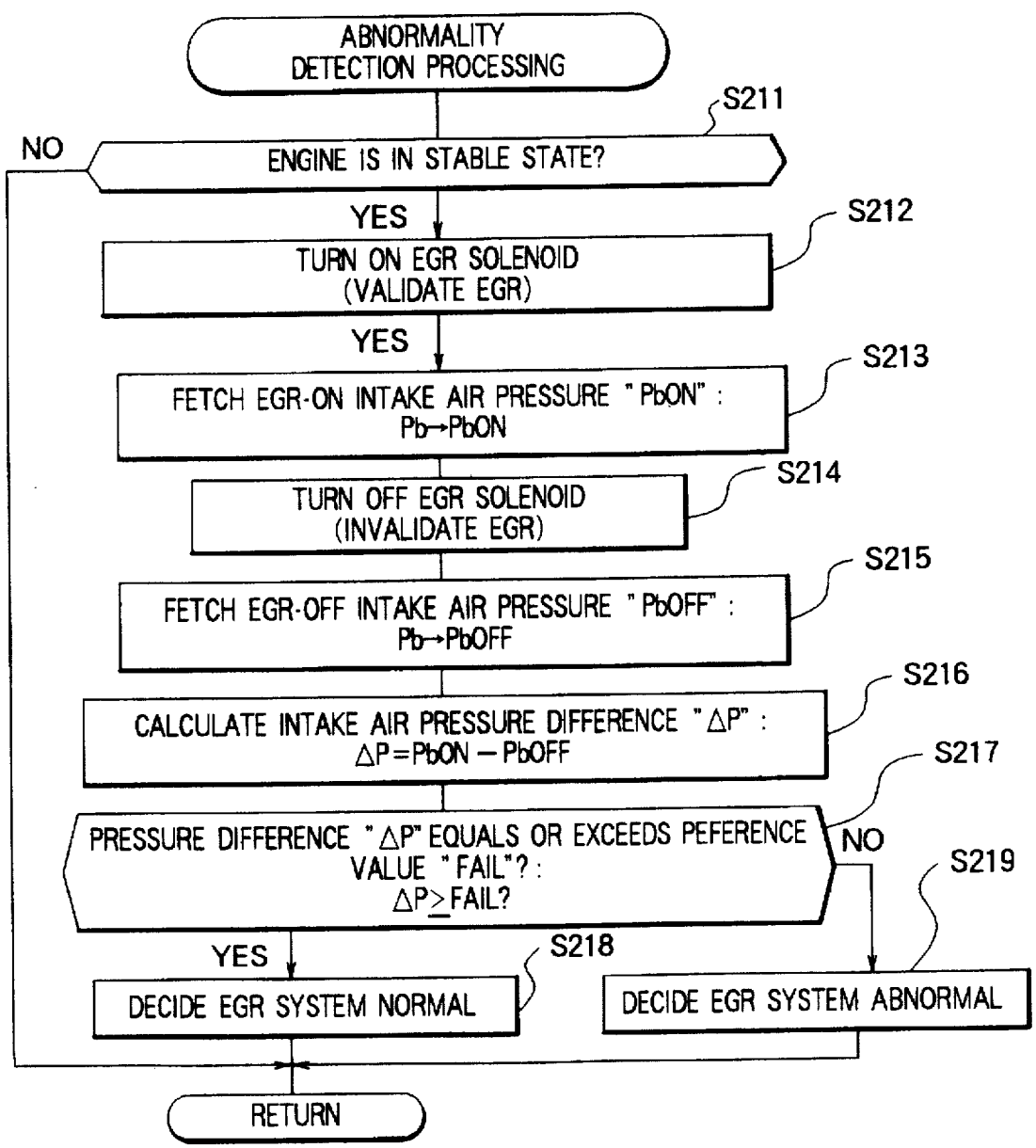
FIG. 11 is a flow chart for illustrating another conventional processing for detecting occurrence of abnormality in an exhaust gas recirculation control system of an engine in a stable state thereof.
Figure 12:
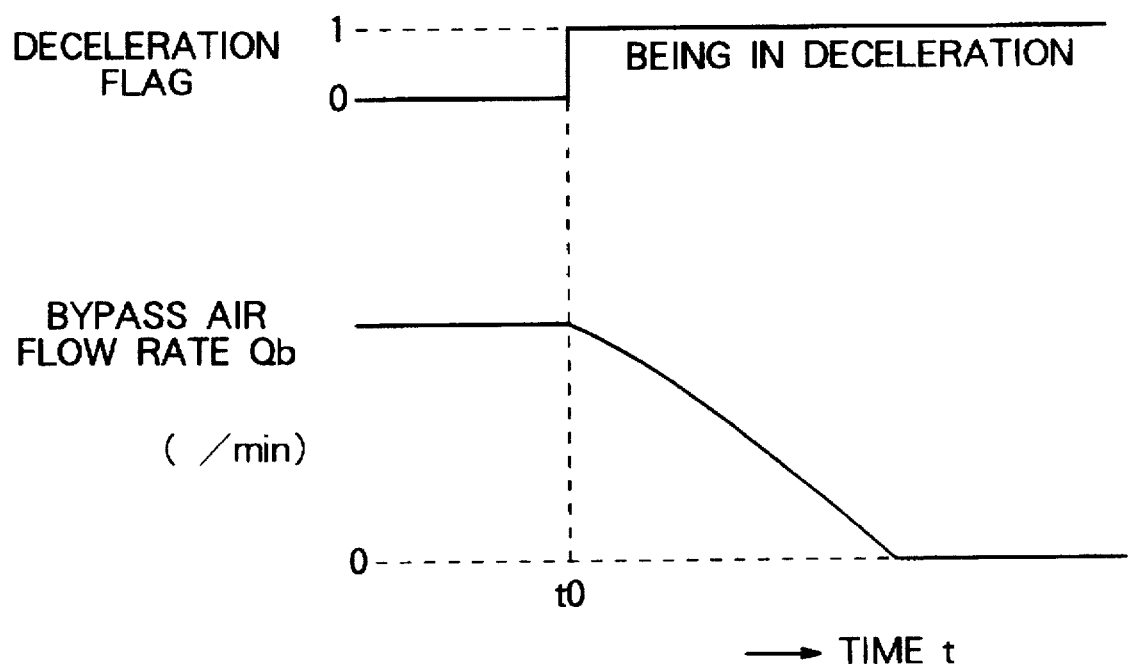
FIG. 12 is a timing chart for illustrating generally behavior of a change in a bypass air flow rate as a function of time lapse in a deceleration state of an internal combustion engine.

Also in the case of the processing routine shown in FIG. 3, the decision step S300 is additionally inserted for the purpose of deciding whether a condition for enabling the abnormality detecting processing is met or not. Namely, in the step S300, decision is made whether the EGR-on duration time TMEGR exceeds a predetermined time XTEGR after the start of the engine. Unless this condition is satisfied, the abnormality detecting processing shown in FIG. 3 is terminated. Parenthetically, the other steps S211 to S219 are essentially same as those designated by like reference characters in FIG. 11.

By providing or inserting additionally the abnormality decision enabling condition step S300 as shown in FIGS. 2 and 3, it can duly be determined that the diagram constituting a major valve element of the EGR control valve 11 is sufficiently warmed up (i.e., the EGR control valve 11 can operate with sufficiently high speed response), when the EGR-on duration time TMEGR exceeds a predetermined time XTEGR even if the ambient temperature is low, whereby the abnormality detection can be carried out with high reliability and accuracy.

Next, description will be made in detail of the abnormality decision of the EGR control system on the basis of an EGR-ratio equivalent value PEGR which is derived from an intake manifold pressure Pb as detected by turning on and off the exhaust gas recirculation in the deceleration state of the engine. At this juncture, it should be mentioned that by using the EGR-ratio equivalent value PEGR instead of the pressure difference ΔP of the intake manifold pressure Pb mentioned hereinbefore, reliability of abnormality decision for the EGR control system can further be enhanced, whereby erroneous abnormality detection due to variations in the atmospheric pressure Pa and the engine load can be prevented more positively.

To this end, the electronic control unit 22 includes a compensating means for compensating for the pressure difference ΔP on the basis of the engine rotation number Ne (rpm) and an EGR-ratio equivalent value arithmetic means for calculating the EGR-ratio equivalent value PEGR corresponding to the EGR flow rate on the basis of the intake manifold pressure Pb as detected by forcibly opening and closing the EGR control valve 11, wherein determination is made on the basis of the EGR-ratio equivalent value PEGR as to whether or not the EGR control system suffers abnormality.

In general, the EGR-ratio equivalent value PEGR remains constant so long as the engine rotation number (rpm) Ne is constant. Accordingly, even if the abnormality decision reference value PEGR(FAIL) is set to a fixed value independent of the atmospheric pressure Pa, erroneous decision concerning occurrence of abnormality in the EGR control system can positively be prevented.

In the processing flow illustrated in FIG. 2, there are additionally provided not only the abnormality decision enabling condition detecting step S300 but also a step S36 for calculating the EGR-ratio equivalent value PEGR in succession to the step S306 for arithmetically determining the corrected intake manifold pressure difference ΔPf.

Furthermore, in the steps S303 and S305, the engine rotation numbers NeOFF and NeON in the EGR-on and EGR-off states, respectively, are detected as well.

Besides, in the step S307, the EGR-ratio equivalent value PEGR is compared with an abnormality decision reference value PEGR(FAIL) which is determined as a function of the engine rotation number Ne.

When it is decided in the step S300 that the EGR-on duration time TMEGR exceeds the predetermined time XTEGR (i.e., when this decision step S300 results in "YES"), then it is decided in a step S101 on the basis of the engine rotation number Ne determined through a processing not shown and the idle signal I indicating the state of the idle switch 18 whether the engine rotation number Ne exceeds a predetermined rotation number and whether the throttle valve 7 is in the fully closed state (i.e., whether the engine and hence the motor vehicle are in the deceleration state), respectively.

When the decision step S101 results in negation "NO", indicating that the motor vehicle is not in the deceleration state, the abnormality detection processing shown in FIG. 2 is terminated. On the other hand, when execution of the above decision step S101 results in affirmation "YES", indicating that the motor vehicle is in the deceleration state, the processing proceeds to the step 102 where the EGR solenoid device 12 is deactivated to invalidate or stop the exhaust gas recirculation. Thus, the EGR-off state is established.

Subsequently, in a step S303, the intake manifold pressure Pb in the EGR-off state is stored as an EGR-off intake manifold pressure value PbOFF, while the engine rotation number Ne detected in the EGR-off state is stored as an EGR-off engine rotation number NeOFF (rpm).

Thereafter, in a step S104, the EGR solenoid device 12 is actuated to validate the exhaust gas recirculation. In a next step S305, the intake manifold pressure Pb is fetched in the EGR-on state in which the exhaust gas recirculation is validated and stored as a value PbON (hereinafter referred to as the EGR-on intake manifold pressure value PbON) and at the same time the engine rotation number Ne detected in this EGR-on state is stored as an EGR-on engine rotation number NeON (rpm).

In this conjunction, it should be mentioned that the measurement of the EGR-off intake manifold pressure value PbOFF and the EGR-on intake manifold pressure value PbON in the steps S303 and S305 are effectuated after the intake manifold pressure Pb has been stabilized in succession to invalidation (turn-off) and validation (turn-on) of the exhaust gas recirculation, respectively, (e.g. after lapse of about one second from the opening and the closing of the EGR control valve 11, respectively). The same holds true in the case where the EGR-on intake manifold pressure value PbON is first measured and thereafter the EGR-off intake manifold pressure value PbOFF is measured. Incidentally, the processing shown in FIG. 2 is finally terminated in the EGR-off state, as described previously, although not illustrated in FIG. 2.

Next, in a step S306, on the basis of an intake manifold pressure difference ΔP between the EGR-on intake manifold pressure value PbON and the EGR-off intake manifold pressure value PbOFF and correcting functions f based on the EGR-on engine rotation number NeON and the EGR-off engine rotation number NeOFF, a corrected intake manifold pressure difference ΔPf is arithmetically determined in accordance with the following expression:

$$\Delta Pf = \Delta P - \{f(NeON) - f(NeOFF)\} \quad (1)$$

Subsequently, in a step S36, an EGR-ratio equivalent value PEGR is calculated on the basis of the corrected intake manifold pressure difference ΔPf obtained in the step S306 and the EGR-off intake manifold pressure value PbOFF in accordance with the following expression (2):

$$PEGR = (\Delta Pf/PbOFF) \times 100 \ [\%] \quad (2)$$

Since the EGR-ratio equivalent value PEGR calculated in this way is standardized by the EGR-off intake manifold pressure value PbOFF, dispersion due to the intake manifold pressure Pb can be suppressed to a minimum, whereby the EGR-ratio equivalent value PEGR can assume a value of high accuracy.

In a step S307, decision is made as to occurrence of abnormality in the EGR control system by checking whether or not the EGR-ratio equivalent value PEGR exceeds the abnormality decision reference value PEGR(FAIL). Thus, owing to the EGR-ratio equivalent value PEGR, the abnormality detecting processing for the EGR control system can be performed accurately with high reliability regardless of changes or variation in the atmospheric pressure Pa and the engine load.

When the decision step S307 results in affirmation "YES", it may duly be regarded that the corrected intake manifold pressure difference ΔPf is sufficiently large, indicating that the exhaust gas recirculation is effected adequately. Accordingly, in a step S108, it is decided that the EGR control system operates normally.

By contrast, when the decision step S307 results in negation "NO", the corrected intake manifold pressure difference ΔPf is regarded to be small, indicating that the exhaust gas recirculation is not effected adequately. Thus, in a step S109, it is decided that the EGR control system suffers some abnormality.

As is apparent from the above description, only when the EGR-on duration time TMEGR after the start of the engine operation exceeds the predetermined time XTEGR and only when the EGR control valve 11 is regarded as operating normally, the processing is allowed to proceed to the step S101 for detecting the abnormality detecting processing enabling condition (i.e., decision as to whether or not the engine is in the deceleration state). Thus, the abnormality detecting processing is inhibited when there is a possibility of erroneous detection. In this manner, the reliability of abnormality detection for the EGR control system can significantly be enhanced.

Besides, by correcting the EGR-on intake manifold pressure value PbON and the EGR-off intake manifold pressure value PbOFF as detected by taking into consideration the EGR-on engine rotation number NeON and the EGR-off engine rotation number NeOFF, the reliability of the abnormality detecting diagnosis for the EGR control system performed by using the EGR-ratio equivalent value PEGR based on the corrected intake manifold pressure difference ΔPf can further be improved.

Although it has been described that the detection values in the EGR-on state and the EGR-off state are once stored in the steps S303 and S305 for calculating the corrected intake manifold pressure difference ΔPf in the step S306, the detected values may be corrected by using a function f of the engine rotation number (rpm) Ne, wherein the corrected value may be employed as the corrected intake manifold pressure difference ΔPf.

In the processing illustrated in FIG. 2, the deceleration state of the engine is set up as the condition for enabling the abnormality detecting processing. However, it should be mentioned that in the case where the stable state is adopted as the condition for enabling the abnormality detecting processing, the abnormality detecting processing for the EGR control system can equally be effectuated with high reliability by adding the processing step S300.

Embodiment 2

In the abnormality detecting apparatus according to the first embodiment of the invention, no consideration is paid to the bypass air flow rate Qb. As a consequence of this, there may arise a possibility that the EGR-ratio equivalent value PEGR varies as the bypass air flow rate Qb varies, involving thus error in the abnormality detection of the EGR control system.

With a second embodiment of the invention, it is contemplated to cope with the undesirable possibility mentioned above.

Figure 8:
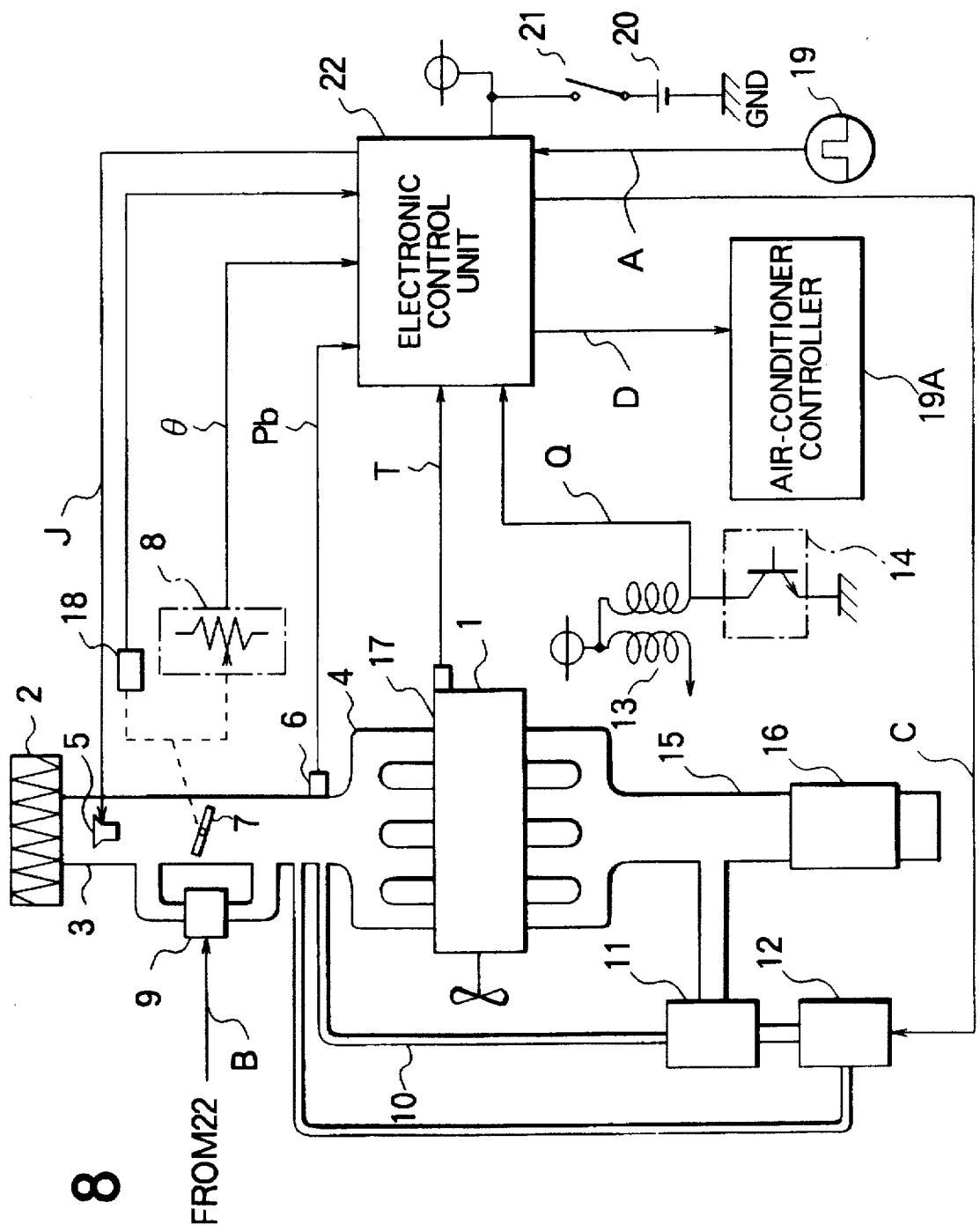
FIG. 8 is a block diagram showing schematically a general arrangement of an exhaust gas recirculation control system for an internal combustion engine.
Figure 9:
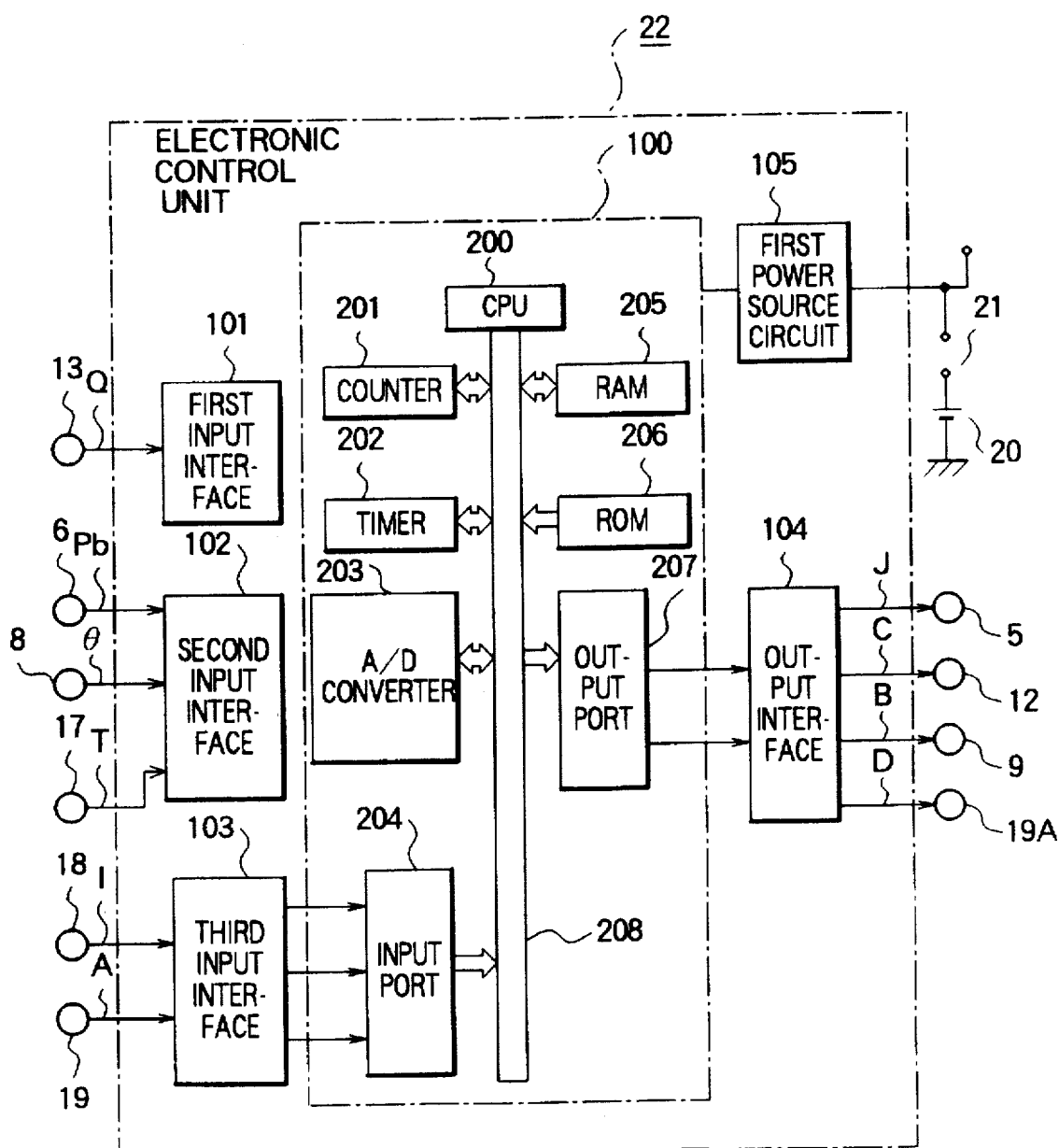
FIG. 9 is a block diagram showing a configuration of an electronic control unit employed in the system shown in FIG. 8.

Now, referring to FIG. 8 together with FIGS. 4 and 5, description will be made of the abnormality detecting apparatus according to the instant embodiment of the invention in which there is employed the EGR-ratio equivalent value PEGR determined on the basis of the intake manifold pressure Pb which is corrected in consideration of not only the engine rotation number Ne but also the bypass air flow rate Qb.

Figure 4:
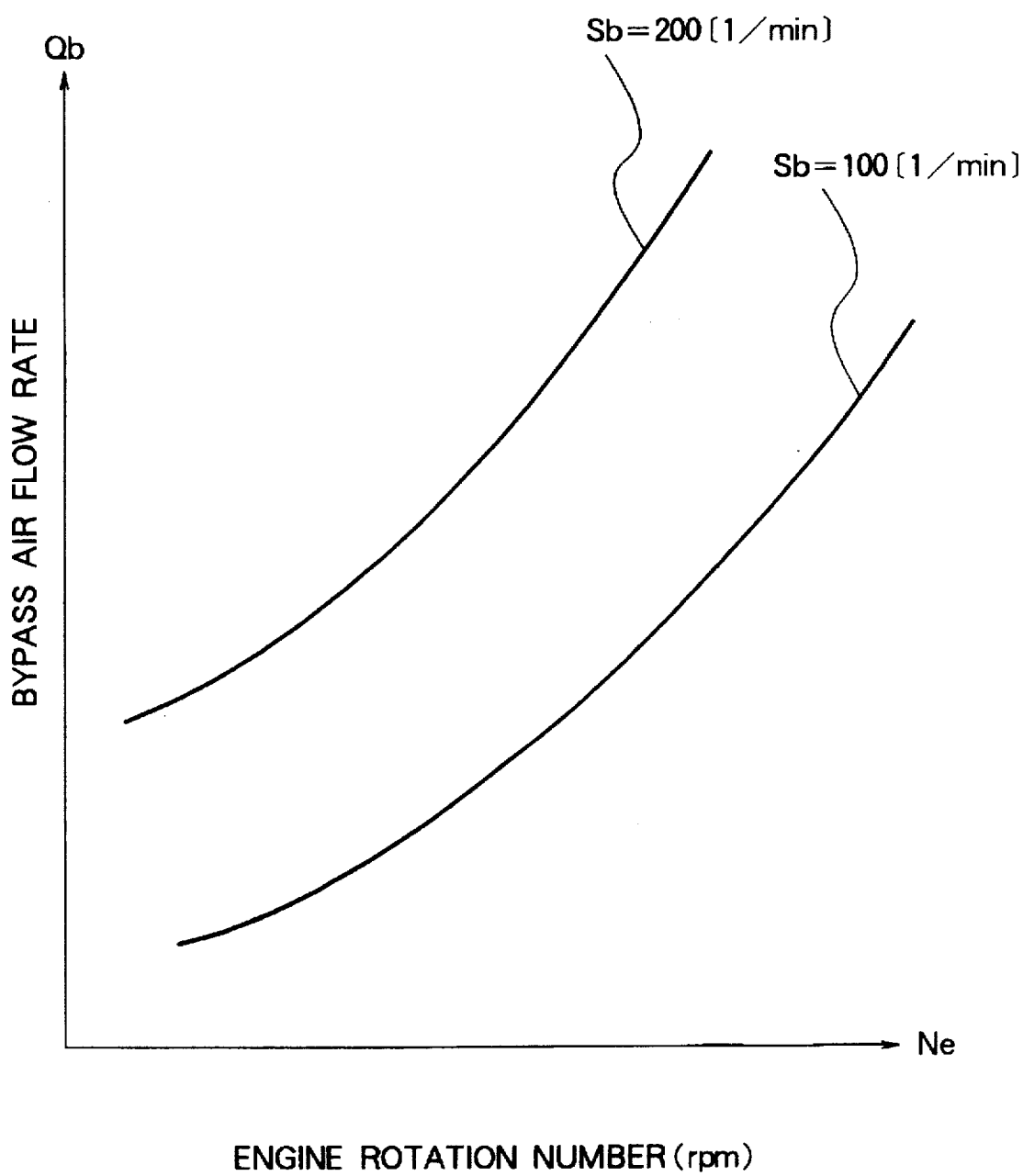
FIG. 4 is a characteristic diagram showing a relation between an engine rotation number and a bypass air flow rate with air flow section area of an ISC solenoid valve device being taken as a parameter for illustrating the concept of the invention underlying a second embodiment thereof.

FIG. 4 is a characteristic diagram illustrating graphically a relation between the engine rotation number Ne and the bypass air flow rate Qb with the air passage sectional area Sb (e.g. 100 l/min and 200 l/min) of the bypass air flow rate control means (ISC solenoid device) 9 being taken as parameters.

As can be seen from FIG. 4, for a same air passage sectional area Sb, the bypass air flow rate Qb varies as a function of the engine rotation number Ne, which in turn means that the intake manifold pressure Pb changes as a function of the engine rotation number Ne. On the other hand, for a same engine rotation number Ne, the bypass air flow rate Qb changes in dependence on the air passage sectional area Sb, and thus the intake manifold pressure Pb changes as a function of the air passage sectional area Sb of the bypass air flow rate control means 9. To say in another way, the EGR-ratio equivalent value PEGR varies in dependence on the operation states of the engine and hence of the motor vehicle.

Thus, according to the present invention incarnated in the instant embodiment, it is taught to correct the intake manifold pressure Pb in dependence on the bypass air flow rate Qb and the engine rotation number Ne, whereon the EGR-ratio equivalent value PEGR for the abnormality decision is arithmetically determined by using the intake manifold pressure Pb as corrected. In this way, there can be realized an abnormality detecting apparatus for the EGR control system, which apparatus is capable of detecting occurrence of abnormality in the EGR control system notwithstanding of variations in the deceleration state and the bypass air flow rate Qb.

In the EGR control system according to the instant embodiment of the invention, the engine rotation number Ne, the fully-opened state information of the throttle valve 7 (corresponding to the idle signal I) and the bypass air flow rate Qb (stored map values) are utilized as the operation state information. Further, the abnormality decision enabling condition detecting means incorporated in the electronic control unit 22 detects as the abnormality decision enabling condition the deceleration state of the engine based on the engine rotation number Ne and the fully closed state of the throttle valve 7.

The abnormality decision means incorporated in the electronic control unit 22 includes an intake manifold pressure correcting means for correcting the EGR-off intake manifold pressure value PbOFF detected upon the EGR control valve 11 is forcibly closed by taking into account the EGR-off engine rotation number NeOFF and the EGR-off bypass air flow rate QbOFF detected upon forcible closing of the EGR control valve 11, and an EGR-ratio equivalent value arithmetic means for calculating the EGR-ratio equivalent value PEGR corresponding to the EGR flow rate on the basis of the intake manifold pressure Pb as corrected, wherein the EGR-ratio equivalent value PEGR is compared with an abnormality decision reference value PEGR(FAIL) for deciding occurrence of abnormality in the EGR control means.

Figure 5:
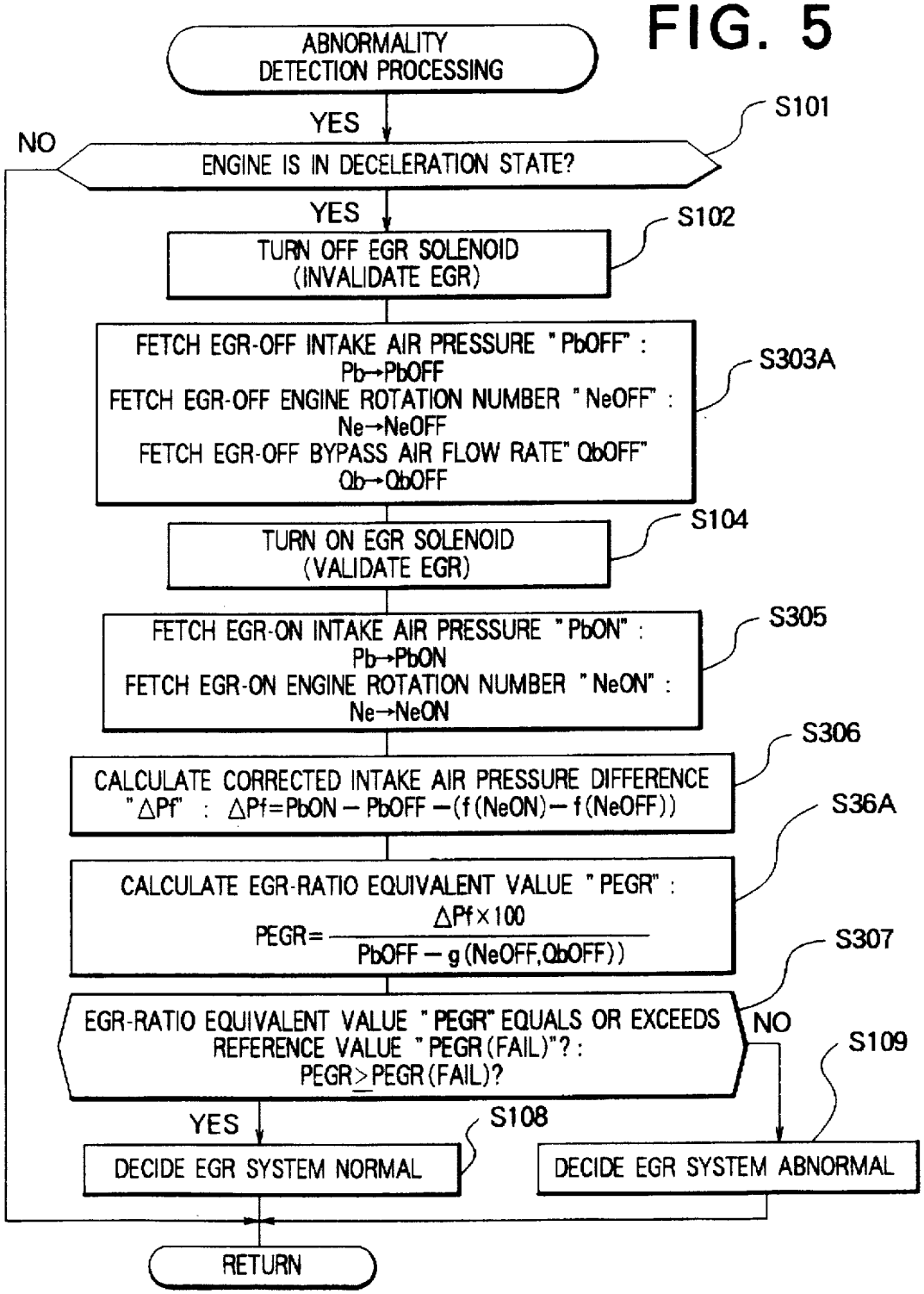
FIG. 5 is a flow chart for illustrating an abnormality detection processing according to the second embodiment of the invention.

Next, referring to a flow chart shown in FIG. 5, operation of the diagnosis apparatus according to the instant embodiment will be elucidated. Incidentally, steps S303A and S36A shown in FIG. 5 correspond to the steps S303 and S36 shown in FIG. 2, respectively. Further, the other processing steps shown in FIG. 5 are essentially same as those denoted by like reference characters in FIG. 2.

At first, in the step S102, the exhaust gas circulation is interrupted. Subsequently, in the step S303A the EGR-off intake manifold pressure value PbOFF, the EGR-off engine rotation number NeOFF (i.e., the engine rotation number in the EGR-off state) and the EGR-off bypass air flow rate QbOFF (i.e., the bypass air flow rate in the EGR-off state) are detected to be stored.

In the step S306, the intake manifold pressure difference ΔPf corrected with the EGR-on engine rotation number NeON and the EGR-off engine rotation number NeOFF is arithmetically determined in accordance with the expression (1) mentioned hereinbefore. Thereafter, in the step S36A, the EGR-ratio equivalent value PEGR is calculated on the basis of the EGR-off intake manifold pressure value PbOFF corrected with the EGR-off engine rotation number NeOFF and the EGR-off bypass air flow rate QbOFF in accordance with the following expression (3).

$$PEGR = \{\Delta Pf/\{PbOFF - g(NeOFF, QbOFF)\}\} \times 100 \quad (3)$$

More specifically, by using the EGR-off intake manifold pressure value PbOFF corrected with the bypass air flow rate ObOFF and the EGR-off engine rotation number NeOFF as determined on the basis of the relation illustrated in FIG. 4, the EGR-ratio equivalent value PEGR is calculated.

Owing to the processing mentioned above, the EGR-ratio equivalent value PEGR can be protected against error due to variations in the bypass air flow rate Qb, whereby the reliability of abnormality detection can further be improved.

In the case of the abnormality detecting or diagnosis apparatus according to second embodiment of the invention, only the deceleration state of the engine is used as the abnormality decision enabling condition. It should however be understood that the EGR-on duration time TMEGR mentioned hereinbefore in conjunction with the first embodiment may additionally be adopted as one of the abnormality decision enabling conditions. In that case, higher reliability can ensured for the abnormality detection of the EGR control system.

Embodiment 3

In the abnormality detecting apparatus according to the second embodiment, no consideration is paid to the cooling water temperature T. However, the opening degree of the thermo-valve (not shown) for bypassing the air across the throttle valve 7 is influenced by the cooling water temperature T, which may incur error in the EGR-ratio equivalent value PEGR. Accordingly, it is preferred to inhibit the abnormality detection for the EGR control system when the thermo-valve is opened. To this end, it is taught by the invention incarnated in the third embodiment thereof that the cooling water temperature T higher than a predetermined temperature XT corresponding to the operation temperature of the thermo-valve is used as the abnormality detection enabling condition.

Now, the abnormality detecting apparatus according to the instant embodiment of the invention will be described by reference to FIGS. 6 and 7 together with FIG. 8. In this conjunction, it should first be pointed out that the thermo-valve installed in parallel to the bypass air flow rate control means 9 is opened under the control of the electronic control unit 22 when the cooling water temperature T is lower than a predetermined temperature XT.

The engine operation state information inputted to the electronic control unit 22 contains the information concerning the cooling water temperature T so that the abnormality decision enabling condition detecting means detects as the condition for permitting the abnormality detection the state in which the cooling water temperature T is higher than the predetermined temperature XT.

Thus, the abnormality detection is inhibited so long as the thermo-valve is opened, whereby the erroneous detection of abnormality in the EGR control system due to variation in the intake manifold pressure Pb as brought about by the intake air flow added through the thermo-valve can positively be prevented.

Figure 6:
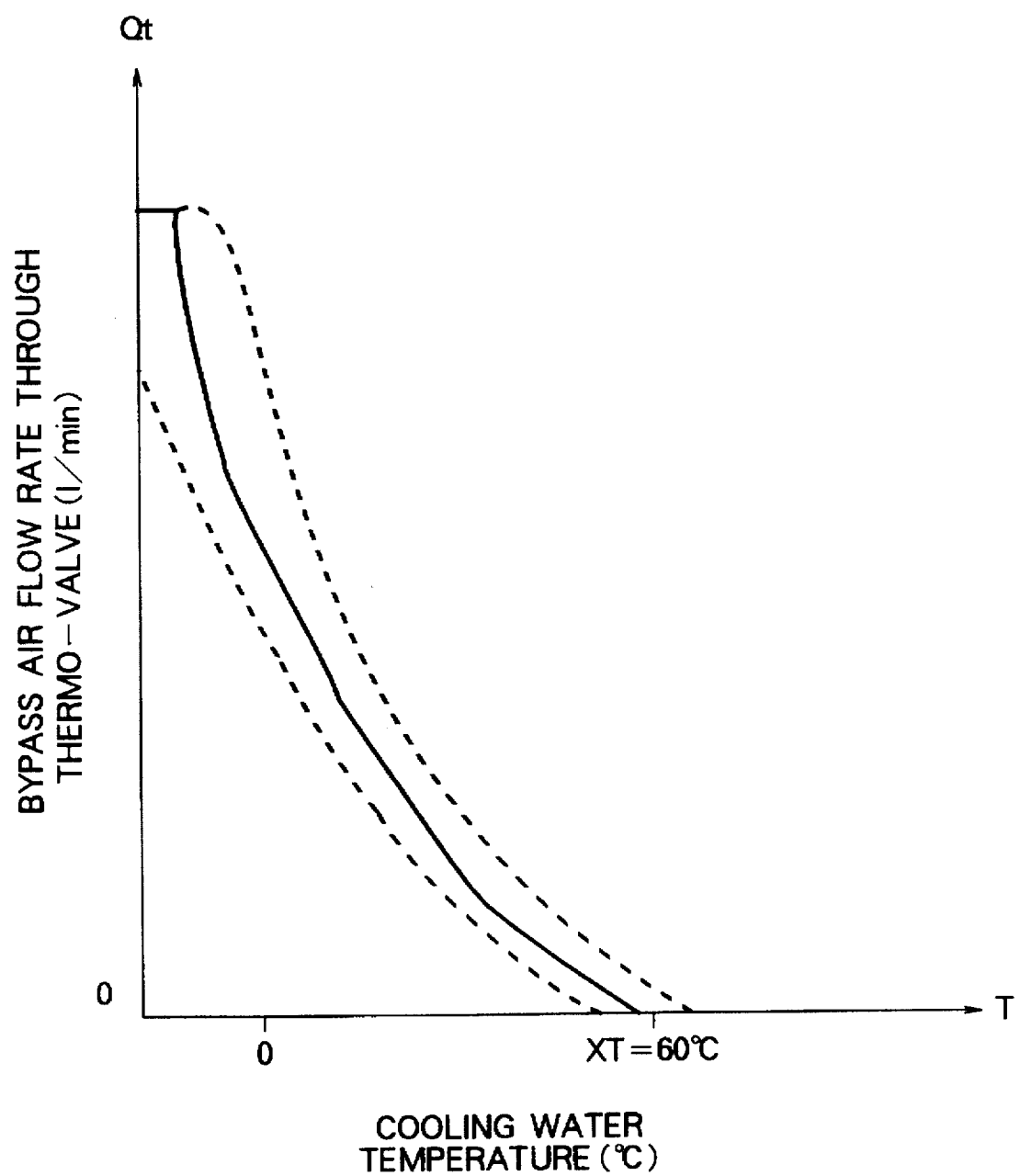
FIG. 6 is a characteristic diagram showing a relation between a cooling water temperature and a flow rate of bypass air flowing through a thermo-valve for illustrating the concept of the invention underlying a third embodiment thereof.

FIG. 6 is a characteristic diagram for graphically illustrating a relation between the cooling water temperature T and the bypass air flow rate Qt passing through the thermo-valve, wherein broken-line curves indicate a range of possible deviations of the bypass air flow Qt passing through the thermo-valve.

As can be seen from FIG. 6, the thermo-valve is opened when the cooling water temperature T is lower than the predetermined temperature XT (e.g. 60° C.). However, the bypass air flow rate Qt flowing through the thermo-valve may vary, as indicated by broken-line curves.

Variation of the bypass air flow rate Qt flowing through the thermo-valve is reflected as variation of the intake manifold pressure Pb, as a result of which the EGR-ratio equivalent value PEGR calculated on the basis of the intake manifold pressure Pb undergoes variation or deviation. For this reason, when the cooling water temperature T is lower than the predetermined temperature XT, the abnormality detecting operation is inhibited for thereby preventing the erroneous detection of abnormality of the EGR control system.

Figure 7:
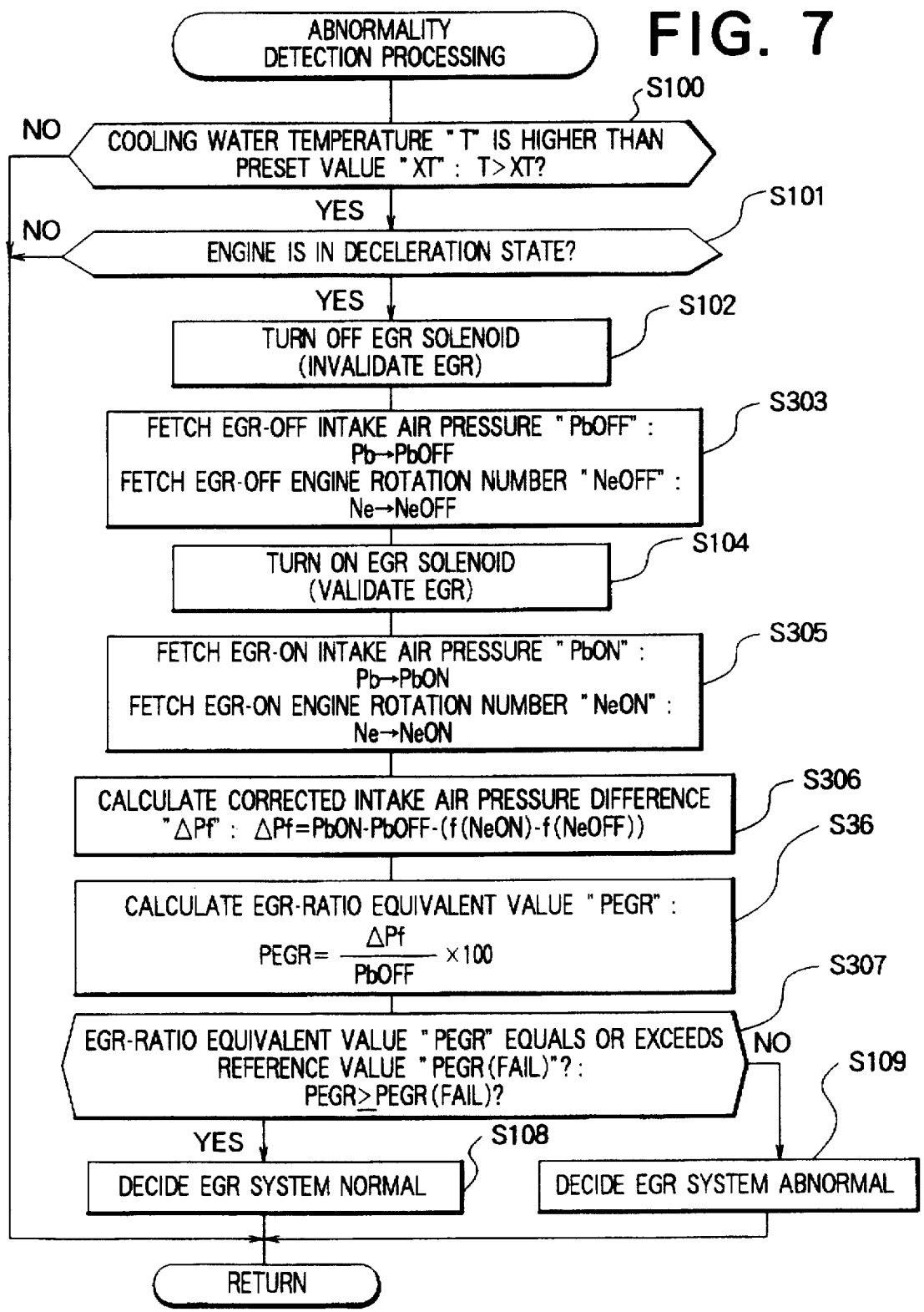
FIG. 7 is a flow chart for illustrating an abnormality detection processing for an exhaust gas recirculation control system according to the third embodiment of the invention.

Next, referring to a flow chart of FIG. 7, operation of the abnormality detecting apparatus according to the instant embodiment will be elucidated. Incidentally, processing flow shown in FIG. 7 differs from that of FIG. 2 in that a step S100 is provided in place of the step S300, wherein in the step S100, decision is made as to whether or not the cooling water temperature T is higher than the predetermined temperature XT, for thereby disabling the abnormality detection when the cooling water temperature T is lower than the predetermined temperature XT. The other steps shown in FIG. 7 are essentially same as those designated by like reference characters in FIG. 2.

Referring to FIG. 7, when it is decided in the step S100 that T≦XT (i.e., when this step results in "NO"), the processing routine shown in FIG. 7 is terminated, while when T>XT (i.e., when the decision step S100 results in "YES"), the processing proceeds to the step S101 where it is decided whether or not the engine is in the deceleration mode.

Through the succeeding steps S102 to S109, abnormality decision for the EGR control system can be performed with high reliability and accuracy without being affected by operation of the thermo-valve.

In the above, it has been described that only the decision as to whether the cooling water temperature T is higher than the predetermined temperature XT or not (step S100) is adopted as the abnormality detection enabling condition. It goes, however, without saying that the decision whether or not the EGR-on duration time TMEGR is greater than the predetermined time XTEGR (step S300) may be added as another abnormality detection enabling condition, as in the case of the apparatus described hereinbefore by reference to FIG. 2 (the first embodiment).

Further, although the EGR-ratio equivalent value PEGR is calculated in the step S36 by using only the intake manifold pressure difference ΔPf corrected in the step S306, it will readily be understood that the EGR-ratio equivalent value PEGR may be calculated by using the intake manifold pressure Pb corrected with the EGR-off engine rotation number NeOFF and the EGR-off bypass air flow rate QbOFF by providing the step S36A shown in FIG. 5. In that case, synergistic effects of the individual embodiments of the invention can be obtained.

Many features and advantages of the present invention are apparent form the detailed description and thus it is intended by the appended claims to cover all such features and advantages of the system which fall within the true spirit and scope of the invention. Further, since numerous modifications and combinations will readily occur to those skilled in the art, it is not intended to limit the invention to the exact construction and operation illustrated and described. Accordingly, all suitable modifications and equivalents may be resorted to, falling within the spirit and scope of the invention.

What is claimed is:

1. An abnormality detecting apparatus for detecting occurrence of abnormality in an exhaust gas recirculation control system of an internal combustion engine, comprising:

intake pipe means for feeding air to said internal combustion engine;

a throttle valve disposed in said intake pipe means to be selectively opened and closed for regulating a flow rate of the air supplied to said internal combustion engine through said intake pipe means;

an exhaust gas recirculation pipe for introducing an exhaust gas of said internal combustion engine to said intake pipe means at a location downstream of said throttle valve for thereby recirculating the exhaust gas through said internal combustion engine;

an exhaust gas recirculation valve disposed in said exhaust gas recirculation pipe for regulating a recirculation flow rate of the exhaust gas flowing through said exhaust gas recirculation pipe;

sensor means for detecting operation state of said internal combustion engine, to thereby output engine operation state information, inclusive of information concerning intake air pressure within said intake pipe means;

exhaust gas recirculation control means for controlling said exhaust gas recirculation valve in dependence on said engine operation state information supplied from said sensor means;

abnormality decision enabling condition detecting means for detecting satisfaction of an abnormality decision enabling condition for enabling a decision concerning occurrence of abnormality in said exhaust gas recirculation control means on the basis of said engine operation state information;

enforcive valve opening/closing means for forcibly opening and/or closing said exhaust gas recirculation valve during a period in which said abnormality decision enabling condition is satisfied; and abnormality decision means for deciding whether abnormality occurs in said exhaust gas recirculation control system on the basis of the intake air pressures detected within said intake pipe means upon enforcive opening/closing of said exhaust gas recirculation valve;

said abnormality decision enabling condition detecting means including exhaust gas recirculation duration time measuring means for measuring a temporal period during which said exhaust gas recirculation valve is maintained in the opened state after starting of said internal combustion engine;

wherein decision as to occurrence of abnormality in said exhaust gas recirculation control system is enabled when said abnormality decision enabling condition detecting means detects as the abnormality decision enabling condition that said temporal period attains or exceeds a predetermined temporal value.

2. An abnormality detecting apparatus according to claim 1, said engine operation state information containing information concerning a cooling water temperature, further comprising:

a thermo-valve for bypassing air flow across said throttle valve when said cooling water temperature is lower than a predetermined temperature;

wherein decision as to occurrence of abnormality in said exhaust gas recirculation control means is enabled when said abnormality decision enabling condition detecting means detects as said abnormality decision enabling condition that said cooling water temperature is higher than said predetermined temperature.

3. An abnormality detecting apparatus according to claim 1, further comprising:

bypass air flow rate control means for controlling rate of bypass air flow which bypasses said throttle valve;

said engine operation state information containing information concerning engine rotation number, fully-closed state of said throttle valve and said bypass air flow rate;

said abnormality decision enabling condition detecting means detecting deceleration state of said internal combustion engine on the basis of said engine rotation number and the fully closed state of said throttle valve as said abnormality decision enabling conditions;

wherein said abnormality decision means includes:

intake air pressure correcting means for correcting the intake air pressures detected within said intake pipe means upon enforcive opening/closing of said exhaust gas recirculation valve with the engine rotation number and the bypass air flow rate detected upon enforcive opening/closing of said exhaust gas recirculation valve; and exhaust gas recirculation ratio equivalent value arithmetic means for arithmetically determining an exhaust gas recirculation ratio equivalent value corresponding to said exhaust gas recirculation flow rate on the basis of said corrected intake air pressure;

said exhaust gas recirculation ratio equivalent value being compared with an abnormality decision reference value to thereby decide whether abnormality occurs in said exhaust gas recirculation control means.

4. An abnormality detecting apparatus according to claim 3, said engine operation state information containing information concerning a cooling water temperature, further comprising:

a thermo-valve for bypassing air flow across said throttle valve when said cooling water temperature is lower than a predetermined temperature;

wherein decision as to occurrence of abnormality in said exhaust gas recirculation control means is enabled when said abnormality decision enabling condition detecting means detects as said abnormality decision enabling condition that said cooling water temperature is higher than said predetermined temperature and that said engine is in said deceleration state.

5. An abnormality detecting apparatus for detecting occurrence of abnormality in an exhaust gas recirculation control system of an internal combustion engine, comprising:

intake pipe means for feeding air to said internal combustion engine;

a throttle valve disposed in said intake pipe means to be selectively opened and closed for regulating a flow of the air supplied to said internal combustion engine through said intake pipe means;

bypass air flow rate control means for controlling rate of bypass air flow which bypasses said throttle valve;

an exhaust gas recirculation pipe for introducing an exhaust gas of said internal combustion engine to said intake pipe means at a location downstream of said throttle valve for recirculating the exhaust gas through said internal combustion engine;

an exhaust gas recirculation valve disposed in said exhaust gas recirculation pipe for regulating a recirculation flow rate of the exhaust gas flowing through said exhaust gas recirculation pipe;

sensor means for detecting operation state of said internal combustion engine, to thereby output engine operation state information, inclusive of information concerning an intake air pressure within said intake pipe means;

exhaust gas recirculation control means for controlling said exhaust gas recirculation valve in dependence on said engine operation state information supplied from said sensor means;

abnormality decision enabling condition detecting means for detecting satisfaction of an abnormality decision enabling condition for enabling a decision concerning occurrence of abnormality in said exhaust gas recirculation control system on the basis of said engine operation state information;

enforcive valve opening/closing means for forcibly opening and/or closing said exhaust gas recirculation valve during a period in which said abnormality decision enabling condition is satisfied; and abnormality decision means for deciding whether abnormality occurs in said exhaust gas recirculation control system on the basis of the intake air pressures detected within said intake pipe means upon enforcive opening/closing of said exhaust gas recirculation valve;

said engine operation state information containing information concerning engine rotation number, fully-closed state of said throttle valve and said bypass air flow rate;

said abnormality decision enabling condition detecting means detecting the deceleration state of said internal combustion engine on the basis of said engine rotation number and the fully closed state of said throttle valve as said abnormality decision enabling conditions;

wherein said abnormality decision means includes:

intake air pressure correcting means for correcting the intake air pressures detected within said intake pipe means upon enforcive opening/closing of said exhaust gas recirculation valve with the engine rotation numbers detected upon enforcive opening/closing of said exhaust gas recirculation valve; and exhaust gas recirculation ratio equivalent value arithmetic means for arithmetically determining an exhaust gas recirculation ratio equivalent value corresponding to said exhaust gas recirculation flow rate on the basis of said corrected intake air pressure and said bypass air flow rate detected upon closing of said exhaust gas recirculation valve;

wherein said exhaust gas recirculation ratio equivalent value is compared with an abnormality decision reference value to thereby decide whether abnormality occurs in said exhaust gas recirculation control means.

6. An abnormality detecting apparatus according to claim 5, said engine operation state information containing information concerning a cooling water temperature, further comprising:

a thermo-valve for bypassing air flow across said throttle valve when said cooling water temperature is lower than a predetermined temperature;

wherein decision as to occurrence of abnormality in said exhaust gas recirculation control means is enabled when said abnormality decision enabling condition detecting means detects as said abnormality decision enabling condition that said cooling water temperature is higher than said predetermined temperature and that said engine is in said deceleration state.

7. An abnormality detecting apparatus for detecting occurrence of abnormality in an exhaust gas recirculation control system of a internal combustion engine, comprising:

intake pipe means for feeding air to said internal combustion engine;

a throttle valve disposed in said intake pipe means to be selectively opened and closed for regulating a flow of the air supplied to said internal combustion engine through said intake pipe means;

an exhaust gas recirculation pipe for introducing an exhaust gas of said internal combustion engine to said intake pipe means at a location downstream of said throttle valve for thereby recirculating the exhaust gas through said internal combustion engine;

an exhaust gas recirculation valve disposed in said exhaust gas recirculation pipe for regulating a recirculation flow rate of the exhaust gas flowing through said exhaust gas recirculation pipe;

sensor means for detecting operation state of said internal combustion engine, to thereby output engine operation state information, inclusive of information concerning intake air pressure within said intake pipe means and cooling water temperature;

thermo-valve means having a threshold operating temperature for bypassing air flow across said throttle valve when said cooling water temperature is lower than a predetermined temperature corresponding to said threshold operating temperature of said thermo-valve means;

exhaust gas recirculation control means for controlling said exhaust gas recirculation valve in dependence on said engine operation state information supplied from said sensor means;

abnormality decision enabling condition detecting means for detecting satisfaction of an abnormality decision enabling condition for enabling a decision concerning occurrence of abnormality in said exhaust gas recirculation control means on the basis of said engine operation state information;

enforcive valve opening/closing means for forcibly opening and/or closing said exhaust gas recirculation value during a period in which said abnormality decision enabling condition is satisfied; and abnormality decision means for deciding whether abnormality occurs in said exhaust gas recirculation control system on the basis of the intake air pressures detected upon enforcive opening/closing of said exhaust gas recirculation valve;

wherein said abnormality decision enabling condition detecting means detects as said abnormality decision enabling condition that said cooling water temperature is not lower than said predetermined temperature.

8. A method of detecting occurrence of abnormality in an exhaust gas recirculation control system of an internal combustion engine which includes intake pipe means for feeding air to said internal combustion engine, a throttle valve disposed in said intake pipe means to be selectively opened and closed for regulating a flow rate of the air supplied to said internal combustion engine through said intake pipe means, an exhaust gas recirculation pipe for introducing an exhaust gas of said internal combustion engine to said intake pipe means at a location downstream of said throttle valve for thereby recirculating the exhaust gas through said internal combustion engine, an exhaust gas recirculation valve disposed in said exhaust gas recirculation pipe for regulating a recirculation flow rate of the exhaust gas flowing through said exhaust gas recirculation pipe, sensor means for detecting operation state of said internal combustion engine, to thereby output engine operation state information, and exhaust gas recirculation control means for controlling said exhaust gas recirculation valve in dependence on said engine operation state information supplied from said sensor means, said method comprising the steps of:

a) deciding whether a temporal period during which said exhaust gas recirculation valve has continued to be opened after starting of said engine attains or exceeds a preset value;

b) deciding on the basis of state of said throttle valve and engine rotation speed acquired through said sensor means whether said engine is in deceleration state only when it is decided that said temporal period attains or exceeds said preset value;

c) closing said exhaust gas recirculation valve by means of said exhaust gas recirculation control means when it is decided in said step b) that said engine is in the deceleration state;

d) acquiring through said sensor means a first intake air pressure within said intake pipe means in the state where said exhaust gas recirculation valve is closed;

e) opening said exhaust gas recirculation valve;

f) acquiring through said sensor means a second intake air pressure within said intake pipe means in the state where said exhaust gas recirculation valve is opened;

g) determining an intake pressure difference between said first and second intake air pressures;

h) comparing said intake pressure difference with a predetermined reference value; and i) deciding occurrence of abnormality in said exhaust gas recirculation control system when said intake pressure difference is smaller than said predetermined reference value.

9. An abnormality detecting method according to claim 8, further comprising the steps of:

j) acquiring a first engine rotation number in the state where said exhaust gas recirculation valve is closed;

k) acquiring through said sensor means a second engine rotation number in the state where said exhaust gas recirculation valve is opened; and l) correcting said intake pressure difference $\Delta P$ in accordance with $$\Delta Pf = \Delta P - \{f(NeON) - f(NeOFF)\}$$

where $\Delta Pf$ represents a corrected intake pressure difference, $\Delta P$ represents the intake pressure difference determined in said step g), $f(NeOFF)$ represents a correcting function based on said first engine rotation number, and $f(NeON)$ represents a correcting function based on said second engine rotation number, wherein occurrence of abnormality in said exhaust gas recirculation system is determined by comparing said corrected intake pressure difference with a predetermined reference value instead of comparing said intake pressure difference in said step h).

10. An abnormality detecting method according to claim 9, further comprising the steps of:

m) determining an exhaust gas recirculation ratio equivalent value on the basis of said corrected intake pressure difference in accordance with $$PEGR = (\Delta Pf / PbOFF) \times 100 \ [\%]$$

where

PEGR represents said exhaust gas recirculation ratio, and

PbOFF represents said first intake air pressure, wherein occurrence of abnormality in said exhaust gas recirculation system is determined by comparing said exhaust gas recirculation ratio equivalent value with a predetermined reference value instead of comparing said corrected intake pressure difference.

11. An abnormality detecting method according to claim 10, wherein said engine is further provided with bypass air flow control means for allowing a part of said intake air to flow across said throttle valve, further comprising the steps of:

n) determining a flow rate of bypass air flowing through said bypass air flow control means in the state where said exhaust gas recirculation valve is closed, wherein said exhaust gas recirculation ratio equivalent value is determined in accordance with:

$$PEGR=[\Delta Pf/\{PbOFF-g(NeOFF, QbOFF)\}]\times 100$$

where g(NeOFF, QbOFF) represents a correcting function based on said first engine rotation number and said bypass air flow rate in the state where said exhaust gas recirculation valve is closed.

12. A method of detecting occurrence of abnormality in an exhaust gas recirculation control system of an internal combustion engine which includes intake pipe means for feeding air to said internal combustion engine, a throttle valve disposed in said intake pipe means to be selectively opened and closed for regulating a flow rate of the air supplied to said internal combustion engine through said intake pipe means, an exhaust gas recirculation pipe for introducing an exhaust gas of said internal combustion engine to said intake pipe means at a location downstream of said throttle valve for thereby recirculating the exhaust gas through said internal combustion engine, an exhaust gas recirculation valve disposed in said exhaust gas recirculation pipe for regulating a recirculation flow rate of the exhaust gas flowing through said exhaust gas recirculation pipe, sensor means for detecting operation state of said internal combustion engine, to thereby output engine operation state information, and exhaust gas recirculation control means for controlling said exhaust gas recirculation valve in dependence on said engine operation state information supplied from said sensor means, said method comprising the steps of:

a) deciding whether a temporal period during which said exhaust gas recirculation valve has continued to be opened after starting of said engine attains or exceeds a preset value;

b) deciding on the basis of state of said engine operation state information fetched through said sensor means whether said engine is in a stable state when it is decided that said temporal period attains or exceeds said preset value;

c) opening said exhaust gas recirculation valve when the engine is in the stable state;

d) acquiring through said sensor means a first intake air pressure within said intake pipe means in the state where said exhaust gas recirculation valve is opened;

e) closing said exhaust gas recirculation valve by means of said exhaust gas recirculation control means;

f) acquiring through said sensor means a second intake air pressure within said intake pipe means in the state where said exhaust gas recirculation valve is closed;

g) determining an intake pressure difference between said first and second intake air pressures;

h) comparing said intake pressure difference with a predetermined reference value; and i) deciding occurrence of abnormality in said exhaust gas recirculation control system when said intake pressure difference is smaller than said predetermined reference value.

13. A method of detecting occurrence of abnormality in an exhaust gas recirculation control system of an internal combustion engine which includes intake pipe means for feeding air to said internal combustion engine, a throttle valve disposed in said intake pipe means to be selectively opened and closed for regulating a flow rate of the air supplied to said internal combustion engine through said intake pipe means, thermo-valve means, having a threshold operating temperature, for allowing a part of the intake air flow to bypass said throttle valve when temperature of cooling water of said engine is lower than a preset value, said preset value corresponding to said threshold operating temperature of said thermo-valve means, an exhaust gas recirculation pipe for introducing an exhaust gas of said internal combustion engine to said intake air pipe means at a location downstream of said throttle valve for thereby recirculating the exhaust gas through said internal combustion engine, an exhaust gas recirculation valve disposed in said exhaust gas recirculation pipe for regulating a recirculation flow rate f the exhaust gas flowing through said exhaust gas recirculation pipe, sensor means for detecting operation state of said internal combustion engine, to thereby output engine operation state information, and exhaust gas recirculation control means for controlling exhaust gas recirculation valve in dependence on said engine operation state information supplied from said sensor means said method comprising the steps of:

a) deciding whether the temperature of said engine cooling water is higher than a preset value;

b) deciding on the basis of state of said throttle valve and engine rotation speed fetched through said sensor means whether said engine is in deceleration state only when it is decided that said engine cooling water temperature is higher than said preset value;

c) closing said exhaust gas recirculation valve by means of said exhaust gas recirculation control means when it is decided in the step b) that said engine is in the deceleration state;

d) acquiring through said sensor means a first intake air pressure within said intake pipe means in the state where said exhaust gas recirculation valve is closed;

e) opening said exhaust gas recirculation valve;

f) acquiring through said sensor means a second intake air pressure within said intake pipe means in the state where said exhaust gas recirculation valve is opened;

g) determining an intake pressure difference between said first and second intake air pressures;

h) comparing said intake pressure difference with a predetermined reference value; and i) deciding occurrence of abnormality in said exhaust gas recirculation gas control system when said intake pressure difference is smaller than said predetermined reference value.

14. A method of detecting occurrence of abnormality in an exhaust gas recirculation control system of an internal combustion engine which includes intake pipe means for feeding air to said internal combustion engine, a throttle valve disposed in said intake pipe means to be selectively opened and closed for regulating a flow rate of the air supplied to said internal combustion engine through said intake pipe means, thermo-valve means for allowing a part of the intake air flow to bypass said throttle valve when temperature of cooling water of said engine is lower than a preset value, an exhaust gas recirculation pipe for introducing an exhaust gas of said internal combustion engine to said intake air pipe means at a location downstream of said throttle valve for thereby recirculating the exhaust gas through said internal combustion engine, an exhaust gas recirculation valve disposed in said exhaust gas recirculation pipe for regulating a recirculation flow rate f the exhaust gas flowing through said exhaust gas recirculation pipe, sensor means for detecting operation state of said internal combustion engine, to thereby output engine operation state information, and exhaust gas recirculation control means for controlling said exhaust gas recirculation valve in dependence on said engine operation state information supplied from said sensor means said method comprising the steps of:
a) deciding whether the temperature of said engine cooling water is higher than a preset value;
b) deciding on the basis of state of said throttle valve and engine rotation speed fetched through said sensor means whether said engine is in deceleration state only when it is decided that said engine cooling water temperature is higher than said preset value;
c) closing said exhaust gas recirculation valve by means of said exhaust gas recirculation control means when it is decided in the step b) that said engine is in the deceleration state;
d) acquiring through said sensor means a first intake air pressure within said intake pipe means in the state where said exhaust gas recirculation valve is closed;
e) opening said exhaust gas recirculation valve;
f) acquiring through said sensor means a second intake air pressure within said intake pipe means in the state where said exhaust gas recirculation valve is opened;
g) determining an intake pressure difference between said first and second intake air pressures;
h) comparing said intake pressure difference with a predetermined reference value;
i) deciding occurrence of abnormality in said exhaust gas recirculation gas control system when said intake pressure difference is smaller than said predetermined reference value;
j) acquiring a first engine rotation number in the state where said exhaust gas recirculation valve is closed;
k) acquiring through said sensor means a second engine rotation number in the state where said exhaust gas recirculation valve is opened; and l) correcting said intake pressure difference ΔP in accordance with $$\Delta Pf = \Delta P - \{f(NeON) - f(NeOFF)\}$$

where
ΔPf represents a corrected intake pressure difference,
ΔP represents the intake pressure difference determined in step g),
f(NeOFF) represents a correcting function based on said first engine rotation number, and
f(NeON) represents a correcting function based on said second engine rotation number,
wherein occurrence of abnormality in said exhaust gas recirculation system is determined by comparing said corrected intake pressure difference with a predetermined reference value instead of comparing said intake pressure difference in step h).

15. An abnormality detecting method according to claim 14, further comprising the steps of:
m) determining an exhaust gas recirculation ratio equivalent value on the basis of said corrected intake pressure difference in accordance with $$PEGR = (\Delta Pf/PbOFF) \times 100 \, [\%]$$

where
PEGR represents said exhaust gas recirculation ratio, and
PbOFF represents said first intake air pressure, wherein occurrence of abnormality in said exhaust gas recirculation system is determined by comparing said exhaust gas recirculation ratio equivalent value with a predetermined reference value instead of comparing said corrected intake pressure difference.

* * * * *